(12) United States Patent
Kisliansky et al.

(10) Patent No.: US 8,988,275 B2
(45) Date of Patent: Mar. 24, 2015

(54) LOW ENERGY RADAR SYSTEM

(75) Inventors: Aviel Kisliansky, Rehovot (IL); Guy Picha, Givat Shmuel (IL); Amit Isseroff, Rehovot (IL)

(73) Assignee: Elbit Systems Land and C4I Ltd., Netanya (IL)

(*) Notice: Subject to any disclaimer, the term of this patent is extended or adjusted under 35 U.S.C. 154(b) by 705 days.

(21) Appl. No.: 13/143,849

(22) PCT Filed: Jan. 31, 2010

(86) PCT No.: PCT/IL2010/000078
§ 371 (c)(1),
(2), (4) Date: Jul. 8, 2011

(87) PCT Pub. No.: WO2010/086858
PCT Pub. Date: Aug. 5, 2010

(65) Prior Publication Data
US 2011/0267219 A1    Nov. 3, 2011

Related U.S. Application Data

(60) Provisional application No. 61/148,938, filed on Jan. 31, 2009.

(51) Int. Cl.
*G01S 13/00* (2006.01)
*G01S 13/02* (2006.01)
(Continued)

(52) U.S. Cl.
CPC ............. *G01S 13/0209* (2013.01); *G01S 7/414* (2013.01); *G01S 13/426* (2013.01); *G01S 13/56* (2013.01)
USPC .......................................................... 342/28

(58) Field of Classification Search
CPC ...... G01S 13/56; G01S 13/04; G01S 12/0209
USPC .......................................................... 342/28
See application file for complete search history.

(56) References Cited

U.S. PATENT DOCUMENTS

| 4,086,592 A | 4/1978 | Lewis et al. |
| 5,404,376 A * | 4/1995 | Dent ............................. 375/138 |

(Continued)

FOREIGN PATENT DOCUMENTS

JP    359128449 A  *  7/1984

OTHER PUBLICATIONS

Cong et al., "Hybrid TDOA/TOA Mobile User Location for Wideband CDMA Cellular Systems", IEEE Transactions on Wireless Communicaitons, vol. 1, No. 3, Jul. 2002.*

(Continued)

*Primary Examiner* — Frank J McGue
(74) *Attorney, Agent, or Firm* — Brown Rudnick LLP

(57) ABSTRACT

A low energy radar comprising a radar signal generator generating a radar signal, a transmitter transmitting the radar signal via a transmitting antenna, a receiving array including plurality of receiving antennas and a plurality of receivers, each antenna being coupled with a corresponding receiver, each of at least selected ones of the receivers receives a respective signal corresponding to reflections of the transmitted radar signal from a scene, a processor including a radar signal processor, the radar signal processor determines a scene reflections map, the scene reflections map includes values representing reflection characteristics from each selected location in the scene, a detector, detecting objects in the scene and the corresponding locations thereof according to the scene reflection map and a clutter map, the clutter map includes values representing clutter reflection characteristics from each selected location in the scene, and a power controller, after the transmitter transmitted the radar signal and the receiving array received the signal corresponding to reflections of the transmitted radar signal, the power controller shuts down at least one of the radar signal generator, the transmitter and the receiving array.

34 Claims, 15 Drawing Sheets

(51) Int. Cl.
    *G01S 7/41*     (2006.01)
    *G01S 13/42*     (2006.01)
    *G01S 13/56*     (2006.01)

(56) References Cited

U.S. PATENT DOCUMENTS

| | | |
|---|---|---|
| 5,499,031 A | 3/1996 | Bodonyi |
| 5,579,012 A | 11/1996 | Iwakuni et al. |
| 5,790,597 A * | 8/1998 | Kurokami et al. ............ 375/233 |
| 6,249,252 B1 * | 6/2001 | Dupray ........................ 342/450 |
| 7,392,011 B1 * | 6/2008 | Jacomb-Hood .............. 455/13.4 |
| 7,525,478 B2 * | 4/2009 | Takano et al. ................. 342/145 |
| 2002/0158790 A1 * | 10/2002 | Fullerton et al. ................ 342/28 |
| 2005/0264438 A1 * | 12/2005 | Fullerton et al. ................ 342/28 |
| 2006/0132353 A1 * | 6/2006 | Natsume et al. .............. 342/147 |
| 2007/0222528 A1 * | 9/2007 | Pernia et al. .................... 331/44 |
| 2010/0109938 A1 * | 5/2010 | Oswald et al. .................. 342/90 |

OTHER PUBLICATIONS

International Search Report and Written Opinion for PCT/IL2010/000078 (15 page).

* cited by examiner

LOW ENERGY RADAR SYSTEM

FIELD OF THE DISCLOSED TECHNIQUE

The disclosed technique relates to radars in general, and to low energy radar systems, in particular.

BACKGROUND OF THE DISCLOSED TECHNIQUE

Employing radar systems for detecting intrusions into protected areas is known in the art. Such radar systems transmit an electromagnetic wave toward the protected area (i.e., either omni-directionally or toward a selected sector) and detect and analyze reflections of the electromagnetic wave from objects in the protected area. The reflections of the electromagnetic wave are analyzed to determine at least the existence of objects and may further be determined, the position and additional properties of the objects. These properties may be, for example, the location of the object (e.g., relative to the radar system), the orientation of the object and the trajectory of the object or the velocity of the object (i.e., the speed and direction of motion of the object). Typically, State the art, radar systems scans the protected area by transmitting the electromagnetic wave via a mechanically rotating directional antenna. Alternatively, state of the art radar systems scan the protected area using an array of antennas (i.e., a transmitting array, a receiving array or both).

U.S. Pat. No. 6,573,857, to Fullerton et al, entitled "System and Method for Intrusion Detection using a Time Domain Radar Array" is directed toward using a sparse array of time modulated ultra wide band radars for intrusion detection. The system to Fullerton includes a plurality of Time Modulated (TM) Ultra-Wide Band (UWB) radars (abbreviated TM-UWB radars) positioned around the protected area. Each TM-UWB radar transmits a UWB pulse or pulses (i.e., a short pulse of low duty cycle) toward the protected area. Each TM-UWB radar receives reflections of these transmitted pulses from objects in the protected area. The range of an object from each TM-UWB radar is determined according to the time-of-flight of the pulse (i.e., from the TM-UWB radar to the object and back to the TM-UWB radar). The position of the object is determined according to the ranges of the object from each one of the TM-UWB radars. Thus, the system to Fullerton creates a radar image of the protected area.

With a stationary target, each signal received after an initial scan of the monitored area will appear substantially identical whereas physical movement within the monitored area will alter the characteristic of the received signals. The received signals are continuously averaged to generate a nominal received signal. The average received signal is subtracted from each succeeding received signal. As stated above, if there is no movement within the monitored area the average received signal and each succeeding received signal will be substantially identical and no signal will result following the subtraction process. If movement does occur within the monitored area, a signal will result after the subtraction process. With a stationary target is present, each signal received after an initial scan of the monitored area will appear substantially identical. Physical movement within the monitored area will alter the characteristic of the received signals. The received signals are continuously averaged to generate a nominal received signal. The average received signal is subtracted from each succeeding received signal to determine movement.

SUMMARY OF THE PRESENT DISCLOSED TECHNIQUE

It is an object of the disclosed technique to provide a novel low energy radar methods and systems. In accordance with the disclosed technique, there is thus provided a low energy radar system, which includes a radar signal generator, a transmitter, a receiving array, a processor and a power controller. The receiving array includes a plurality of receiving antennas and a plurality of receivers. The processor includes a radar signal processor and a detector. Each receiver is coupled with a corresponding antenna. The radar signal processor is coupled with the receiving array. The detector is coupled with the radar signal processor. The power controller is coupled with the radar signal generator, with the transmitter, with the receiving array and with the processor. The radar signal generator generates a radar signal. The transmitter transmits the radar signal via a transmitting antenna. Each of at least selected ones of the receivers in the receiving array receives a respective signal corresponding to reflections of the transmitted radar signal from a scene. The radar signal processor determines a scene reflections map. The scene reflections map includes values representing reflection characteristics from each selected location in the scene. The detector detects objects and targets in the scene and the corresponding location thereof according to the scene reflection map and a clutter map. The clutter map includes values representing clutter reflection characteristics from each selected location in the scene. The shuts down at least one of the radar signal generator, the transmitter and the receiving array.

In accordance with another aspect of disclosed technique, there is thus provided a low energy radar system, which includes a radar signal generator, a receiver, a transmitting array, a processor and a power controller. The transmitting array includes a plurality of transmitting antennas and a plurality of transmitters. The processor includes a radar signal processor and a detector. Each transmitter is coupled with a corresponding antenna and with the radar signal generator. The receiver is coupled with the radar signal processor. The radar signal processor is coupled with the receiver. The detector is coupled with the radar signal processor. The power controller is coupled with the radar signal generator, with the transmitting array, with the receiver and with the processor. The radar signal generator generates a radar signal. Selected ones of the transmitters sequentially transmit a respective signal toward a selected direction in a scene. The receiver receives reflected signals from the selected direction in the scene. The radar signal processor determines a scene reflections map. The scene reflections map includes values representing reflection characteristics from each selected location in the scene. The detector detects objects and targets in the scene and the corresponding location thereof according to the scene reflection map and a clutter map. The clutter map includes values representing clutter reflection characteristics from each selected location in the scene. The shuts down at least one of the radar signal generator, the transmitting array and the receiver.

In accordance with a further aspect of disclosed technique, there is thus provided a low energy radar method. The method includes the procedures of determining a clutter map of a scene, transmitting a radar signal toward the scene and receiving by each of at least selected ones of antennas in an antenna array a respective signal corresponding to reflections of the transmitted signal from the scene. The method further includes the procedures of processing the received signals to determine a scene reflection map and detecting objects in the scene and the locations thereof at least according to the scene reflection map and the clutter map.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a novel low energy radar system and method, the radar system operates at a low transmission duty cycle, thereby reducing power dissipation of thereof. Furthermore, the low energy radar system of the disclosed technique employs either a receiving array or a transmitting array or both, receiving from or transmitting toward selected directions, thereby enabling the power dissipation typically associated with mechanically scanning an area (e.g., with a rotating directional antenna) to be reduced. The low energy radar system according to the disclosed technique is typically employed to detect objects in the vicinity of a protected area (e.g., the perimeter of a plant or an airport).

Figure 1A:
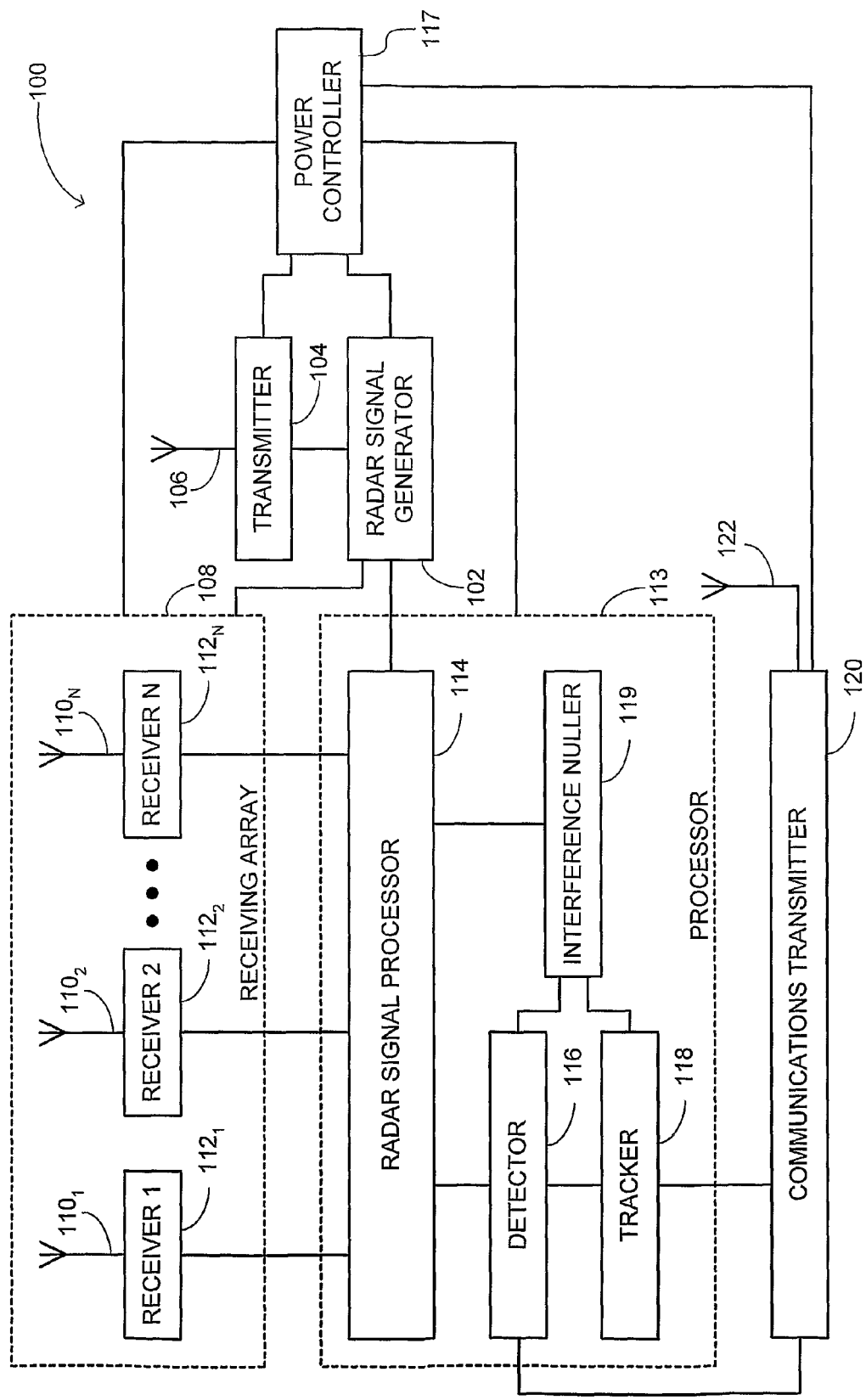
FIG. 1A is a schematic illustration of a low energy radar system, constructed and operative in accordance with an embodiment of the disclosed technique.

Reference is now made to FIG. 1A, which is a schematic illustration of a low energy radar system, generally referenced 100, constructed and operative in accordance with an embodiment of the disclosed technique. Low energy radar system 100 includes a radar signal generator 102, a transmitter 104, a transmitting antenna 106, a receiving array 108, a processor 113, a power controller 117, a communications transmitter 120 and a communications antenna 122. Processor 113 includes a radar signal processor 114, a detector 116, a tracker 118 and an interference nuller 119. Receiving array 108 includes a plurality of receiving antennas $110_1$, $110_2$, ..., $110_N$ and a plurality of receivers $112_1$, $112_2$, ..., $112_N$. In FIG. 1A, transmitting antenna 106 may be an omni-directional transmitting antenna or a directional transmitting antenna (e.g., horn antenna, Yagi antenna). Thus, transmitting antenna 106 may transmit only toward the directions associated with the directionality of the antenna. It is noted that transmitting antenna 106 does not mechanically scan the protected area. Furthermore, each one of receiving antennas $110_1, 110_2, \ldots, 110_N$, may be an omni-directional antenna or a directional antenna (e.g., a horn antenna, a Yagi antenna or a printed circuit antenna). Thus, each one of antennas receiving $110_1, 110_2, \ldots, 110_N$, receives signals from the directions associated with the directionality of the antenna. It is noted that when radar system 100 is setup, receiving antennas $110_1$, $110_2, \ldots, 110N$ are positioned at known relative positions (i.e., locations and orientations) there between. Receiving antennas $110_1, 110_2, \ldots, 110_N$ may also be positioned in a known geometrical structure (e.g., circular, square or linear). Thus, the delays of the received signals may be adjusted such that the signals received by all of receiving antennas $110_1$, $110_2, \ldots, 110_N$, from a selected direction, constructively interfere, thereby defining an elongated area, known as the main lobe of the antenna beam pattern.

Power controller 117 is coupled with radar signal generator 102, with transmitter 104, with receiving array 108, with processor 113 and with communications transmitter 120. Transmitter 104 is further coupled with transmitting antenna 106 and with radar signal generator 102. Radar signal generator is further coupled with receiving array 108. Each one of receivers $112_1, 112_2, \ldots, 112_N$ is coupled with a corresponding one of receiving antennas $110_1, 110_2, \ldots, 110_N$ and with radar signal processor 114. Radar signal processor 114 is further coupled with radar signal generator 102, with detector 116 and with interference nuller 119. Tracker 118 is coupled with detector 116 with interference nuller 119 and with communications transmitter 120. Interference nuller 119 is further coupled with detector 116. Communications transmitter is further coupled with communications antenna 122 and with detector 116.

In general, radar system 100 attempts to at least detect moving objects located at selected locations in a protected area or scene. To that end, radar signal generator 102 generates a radar signal. This radar signal may be a continuous wave (CW) signal (e.g., a sine wave signal, a chirp signal transmitted during a transmission time-period) or a plurality of pulses (i.e., also transmitted during the transmission time-period). The pulses may be modulated (e.g., chirp) or unmodulated. When the pulses are modulated, each pulse may be modulated with a different modulation scheme. Radar signal generator 102 provides the radar signal to transmitter 104, to radar signal processor 114 and to each one of receivers $112_1, 112_2, \ldots, 112_N$ in receiving array 108. Transmitter 104 transmits the radar signal via transmitting antenna 106. For example, when, radar system 100 is employed to detect humans, the radar signal repetition rate may be on the order of seconds and a duty cycle on the order of 1% can be achieved. The duty cycle of the transmitted signal substantially reduces the power dissipation of low energy radar system 100 relative to prior art radars.

The transmitted signal reflects off objects (i.e., stationary or moving objects) in the scene (not shown) around low energy radar system 100, back towards low energy radar system 100. Each of at least selected ones of receivers $112_1$, $112_2$, ..., $112_N$ receives, via the respective ones of receiving antennas $110_1$, $110_2$, ..., $110_N$, a respective reflected signal corresponding to reflections of the transmitted signal from the scene (i.e., the selected ones of receivers $112_1$, $112_2$, ..., $112_N$ simultaneously receives signals from all the directions corresponding thereto and from all the ranges). Each one of the selected ones of receivers $112_1$, $112_2$, ..., $112_N$ provides the received signal thereby to radar signal processor 114. Radar signal processor 114 determines a composite signal associated with each selected location (i.e., a selected direction and a selected range) according to the received signals received by the selected ones of receivers $112_1$, $112_2$, ..., $112_N$. For example, when transmitter 106 transmits a CW chirped signal, via identical non-coupled antennas, radar signal processor 114 filters, in each received signal, the same frequency band corresponding to the selected range and adjust the phase of the filtered received signals to orient system 100 in the selected direction. Radar signal processor 114 then sums the filtered received signal to produce the composite signal associated with a location. After transmitter 104 transmitted the radar signal and receiving array 108 received the reflection of the transmitted radar signal, power controller 117 shuts down radar signal generator 102, transmitter 104 and receiving array 108 (and consequently receivers $112_1$, $112_2$, ..., $112_N$) or at least one thereof.

Prior to object detection, radar signal processor 114 determines a clutter map of the scene. The clutter map includes the values representing the reflection characteristics of substantially stationary objects located at the selected locations in the scene (e.g., trees, houses, parked cars). The clutter map may be a matrix, in which each entry is associated with a corresponding selected location (i.e., a corresponding selected range and a corresponding selected direction relative to system 100) in the scene. Each entry in the matrix includes a set of values representing the clutter reflection characteristics respective of that location. These clutter reflection characteristics include, for example, the average energy level from the location (i.e., average energy level of the composite signal associated with the location) and the average composite delay from the corresponding location (i.e. delay of the composite signal associated with the location). Each entry in the clutter map may further include statistical characteristics associated with the clutter reflection characteristics (e.g., the variance of the energy levels and the variance of the composite delays). Each entry in the clutter map may further include detection thresholds for each clutter reflection characteristics, as further explained below.

During object detection, radar signal processor 114 processes the received signals from receivers $112_1$, $112_2$, ..., $112_N$ and determines a scene reflection map. The scene reflections map includes the values representing the reflection characteristics of all of the objects located at the selected locations in the scene (e.g., trees, houses, moving car and humans). Similar to the clutter map, the scene reflection map may be a matrix. Each entry in the matrix is associated with a corresponding selected location (i.e., a corresponding selected range and a corresponding selected direction) in the scene. Each entry in the matrix includes a set of values representing the reflection characteristics of the selected location corresponding to that entry. Furthermore, radar signal processor 114 updates the clutter map according to the scene reflection map. It is noted that, as mentioned above, at least selected ones of receivers $112_1$, $112_2$, ..., $112_N$ simultaneously receive, via a respective one of receiving antennas $110_1$, $110_2$, ..., $110_N$, signals reflected from all locations in the scene. However, radar signal processor 114 processes the received signals to determine the reflection characteristics only from the selected locations in the scene (i.e., the selected location do not necessarily correspond to all of the locations from which the antennas receive the signals). Radar signal processor 114 is further described below in FIG. 5.

Radar signal processor 114 provides the determined scene reflections map and the clutter map to detector 116. Radar signal processor 114 further provides the determined scene reflection map to interference nuller 119. Detector 116 detects objects in the scene and the corresponding locations thereof according to the scene reflection map and the clutter map. The term 'detected object' refers herein to any object detected in the scene. Detector 116 provides the detected objects and the corresponding locations thereof to tracker 118. Tracker 118 tracks the detected objects, and determines the parameters related to these detected objects (e.g., size, trajectory and speed) in the scene. Tracker 118 determines if the detected objects correspond to targets in the scene. The term 'target' refers herein to a group of previously and currently detected objects, associated to a single moving object in the scene, which exhibits at least a selected group of target characteristics. These target characteristics may be, for example, previously and currently locations of the moving detected object in the scene (i.e., locations at which the moving detected object is located relative to system 100). The target characteristics may further be the estimated velocity of the moving detected object in the scene, the estimated direction of motion of the moving detected object in the scene. The target characteristics may also be the previous and current composite signals characteristics of the moving detected object in the scene or part thereof. Tracker 118 may further classify the targets (e.g., human, car) and determine when and whether these targets correspond to targets of interest (e.g., a car moving toward the protected area might be a target of interest). Detector 116 may store the characteristics of the detected objects and tracker 118 may store the characteristics of the targets and of targets of interest in a database (not shown). Each one of tracker 118 and detector 116 provide parameters associated with a selected portion of the detected objects to interference nuller 119. Recall, a target is defined as a group of detected objects associated to a single detected moving object exhibiting common characteristics. Thus, tracker 118 provides the parameters associated with these groups of detected objects to interference nuller 119. Interference nuller 119 determines the effect of the interfering object (i.e., at least a portion of detected objects are interfering objects) on the signals received by each one of receivers $112_1$, $112_2$, ..., $112_N$. Consequently, interference nuller 119 nulls the effects of the interfering object on scene reflection maps at least according to the locations of the interfering objects as further explained below in conjunction with FIG. 5. After radar signal processor 114 processed the received signals, detector 116 detected objects in the scene and tracker 118 tracked the detected objects, determined targets and targets of interest in the scene, power controller 117 may shut down processor 113.

Detector 116 provides the information relating detected objects (e.g., location, signal characteristics or both) to communications transmitter 120. Tracker 118 may also provide information relating to the targets and targets of interest (e.g., the detected object characteristics associated with the target or the classification of the target) to communications transmitter 120. Communications transmitter 120 transmits at least a portion of the information provided thereto to a control station (not shown) via communications antenna 122. Although in FIG. 1A, communication transmitter 120 may be wirelessly coupled with the control station, communication transmitter 120 may be coupled with the control station via a wire (e.g., coax cable, twisted pair and the like). It is noted however that communications transmitter 120 and communication antenna 122 may be replaced with an alarm system providing an indication when an object, a target or a target of interest is detected. This indication may be a visual and audio or a tactile indication. After communications transmitter 120 transmitted the data to the control station, power controller 117 shuts down communications transmitter 120.

Figure 1B:
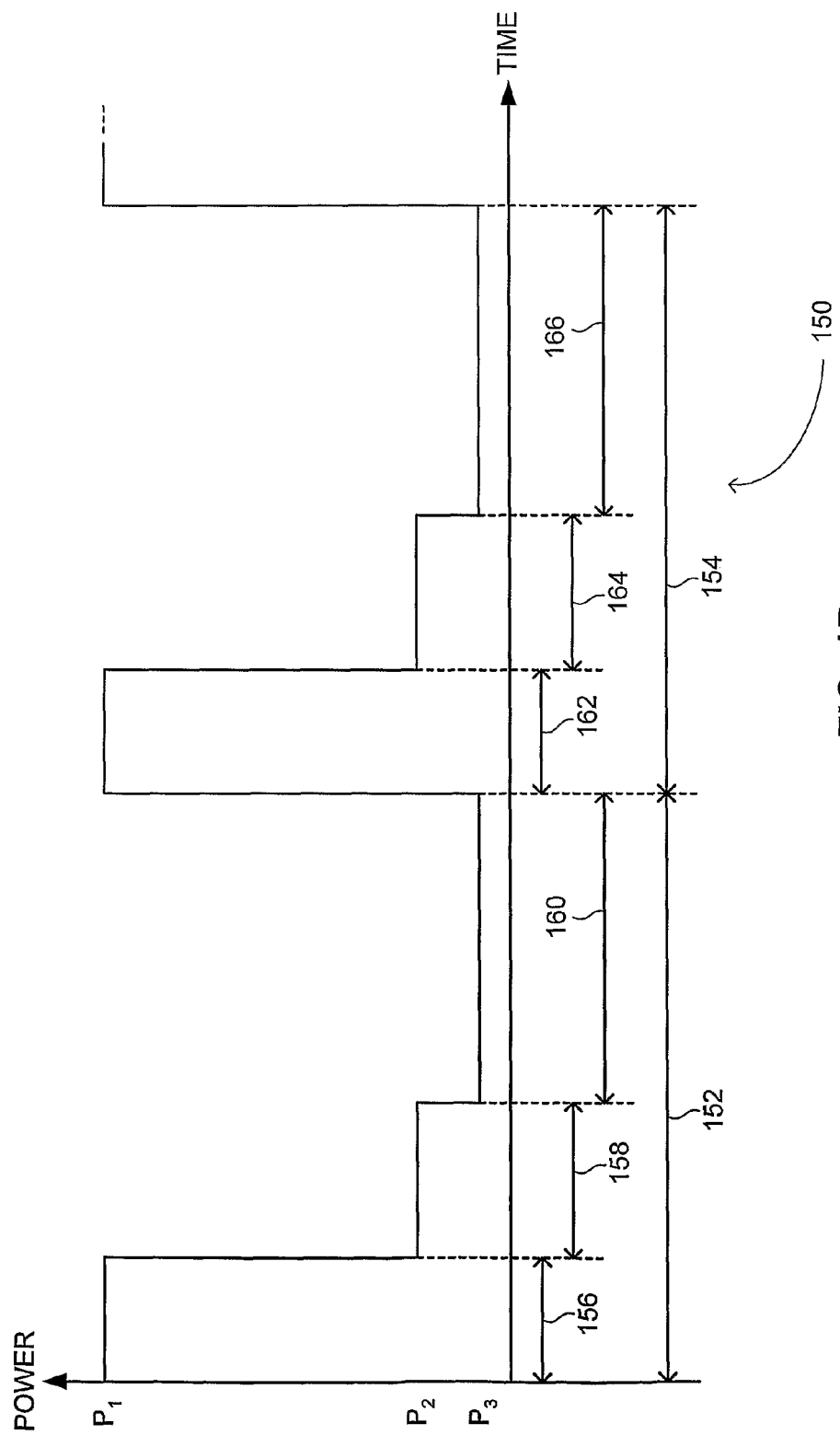
FIG. 1B is a schematic illustration of a power versus time diagram of the low energy radar system of FIG. 1A, in accordance with an embodiment of the disclosed technique.

Reference is now made to FIG. 1B, which is a schematic illustration of a power versus time diagram, generally reference 150, of the low energy radar system 100 of FIG. 1A, in accordance with an embodiment of the disclosed technique. In diagram 150, time periods 152 and 154 represent the transmitted signal repetition interval, i.e., each of time periods 152 and 154 represent a cycle in the operation of low energy radar system 100 (FIG. 1A). Time-periods 156 and 162 represent the signal transmission and reception period (i.e., the time required to transmit the signal). Time-periods 158 and 164 represent the signal processing period. Each one of signal processing periods 158 and 164 represents the time of operation of processor 113. Time-periods 160 and 166 represent idle periods in which the system 100 dissipates substantially no power. In general, after the signal transmission period 156 and 162, power controller 117 shuts down radar signal generator 102, transmitter 104 and receiving array 108 (and consequently receivers $112_1, 112_2, \ldots, 112_N$). After processing time periods 158 and 164, power controller 117 shuts down processor 113. It is noted that after idle period 160, prior to transmission period 162, power controller 117 powers up at least radar signal generator 102, transmitter 104 and receiving array 108 and consequently receivers $112_1, 112_2, \ldots, 112_N$. Furthermore, prior to processing period 164, power controller 117 powers up processor 113. In general, the power consumption of the radar system according to the disclosed technique depends on the system requirements (e.g., maximum required range, scan refresh rate) main lobe aperture angle and system components. For example, when system 100 detects humans at a maximum range of 300 meters, with a main lobe aperture angle of 30 degrees and a processor operating power of 200 milli-Watts, the duration of each of time-periods 152 and 154 (i.e., the transmitted and received signal repetition intervals) may be on the order of 1 second. The duration of each of signal transmission and reception time-periods 156 and 162 may be on the order of 10 millisecond and the power dissipated during these periods (i.e., $P_1$) may be on the order on 10 Watts. The duration of each of the signal processing time-periods 158 and 164 may be on the order of 100 milli-seconds and the power dissipation is 200 milli-Watts (i.e., $P_2$).

Figure 2A:
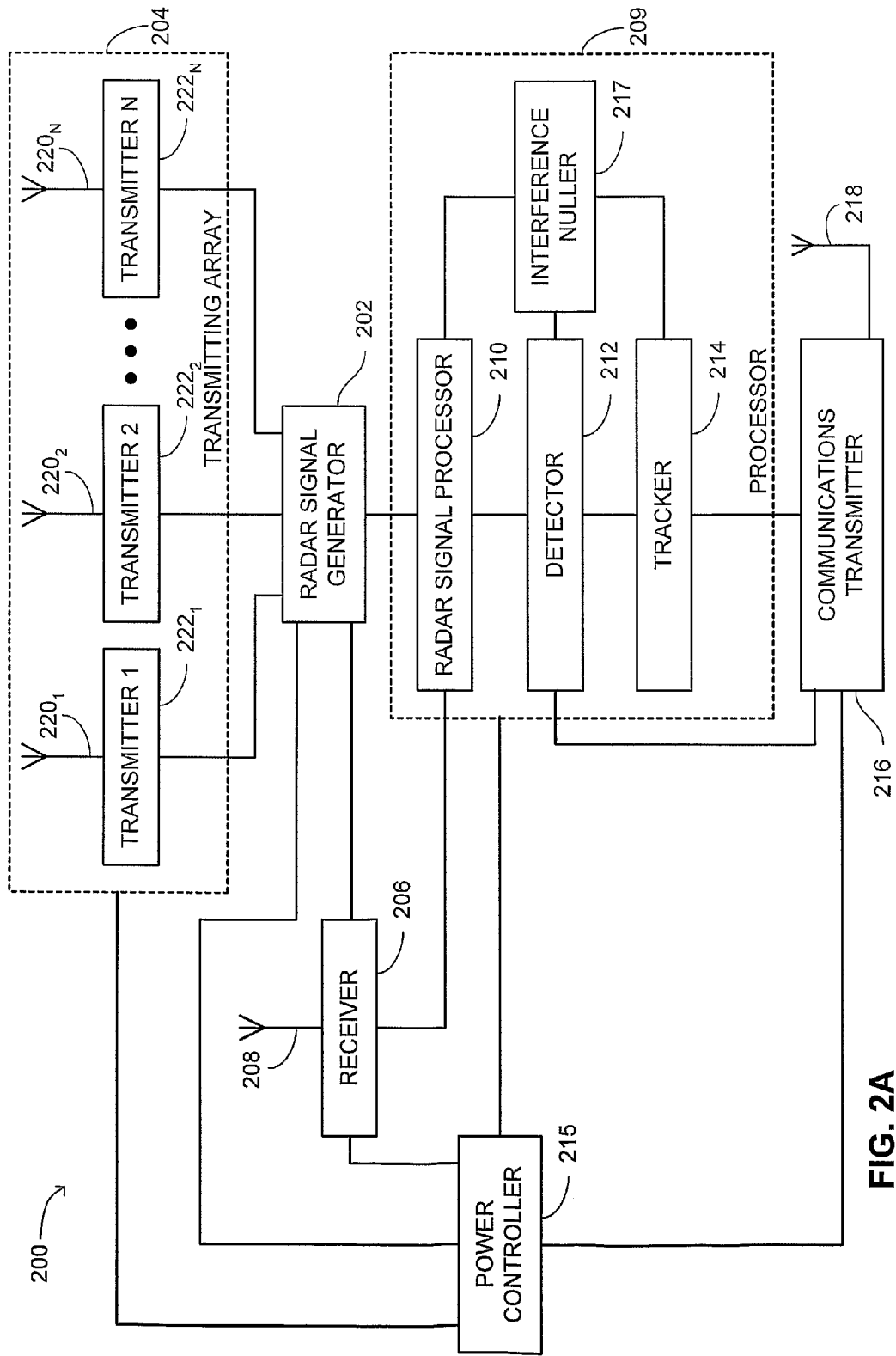
FIG. 2A is a schematic illustration of a low energy radar system constructed and operative in accordance with another embodiment of the disclosed technique.

Reference is now made to FIG. 2A, which is a schematic illustration of a low energy radar system, generally referenced 200, constructed and operative in accordance with another embodiment of the disclosed technique. Low energy radar system 200 includes a radar signal generator 202, a transmitting array 204, a receiver 206, a receiving antenna 208, a processor 209, a power controller 215, communications transmitter 216 and a communications antenna 218. Processor 209 includes a radar signal processor 210, a detector 212, a tracker 214 and an interference nuller 217. Transmitting array 204 includes a plurality of transmitting antennas $220_1, 220_2, \ldots, 220_N$ and a plurality of transmitters $222_1, 222_2, \ldots, 222_N$. In FIG. 2A, receiving antenna 208 may be and omni-directional receiving antenna or a directional receiving antenna (e.g., horn antenna, Yagi antenna). Thus, receiving antenna 208 may receive signals only from the directions associated with the directionality of the receiving antenna. Receiving antenna 208 does not mechanically scan the protected area. Furthermore, each one of transmitting antennas $220_1, 220_2, \ldots, 220_N$, may be an omni-directional antenna or a directional antenna (e.g., a horn antenna, Yagi antenna). Thus, each one of antennas $220_1, 220_2, \ldots, 220_N$, transmits signals toward the directions associated with the respective directionalities of the transmitting antenna. It is noted that when radar system 200 is setup, transmitting antennas $220_1, 220_2, \ldots, 220N$ are positioned at known relative positions (i.e., locations and orientations) there between. Transmitting antennas $220_1, 220_2, \ldots, 220_N$ may also be positioned in a known geometrical structure (e.g., circular, square or linear). Thus, the delay of the transmitted signals may be adjusted such that the signals transmitted by all of transmitting antennas $220_1, 220_2, \ldots, 220_N$, toward a selected direction, constructively interfere, thereby defining an elongated area, known as the main lobe of the antenna beam pattern. Furthermore, receiver 206 and receiving antenna 208 may be replaced with a receiving array similar to receiving array 108 (FIG. 1A). Thus, the receiving array may receive signals from the selected direction toward which transmitting antennas $220_1, 220_2, \ldots, 220_N$ transmitted.

Power controller 215 is coupled with radar signal generator 202, with transmitter array 204, with receiver 206, with processor 209, and with communications transmitter 216. Each one of transmitters $222_1, 222_2, \ldots, 222_N$ is coupled with a corresponding one of transmitting antennas $220_1, 220_2, \ldots, 220_N$ and with radar signal generator 202. Receiver 206 is further coupled with a corresponding receiving antenna 208, with radar signal processor 210 and with radar signal generator 202. Radar signal processor 210 is further coupled with radar signal generator 202, with detector 212 and with interference nuller 217. Tracker 214 is coupled with detector 212 and with interference nuller 217. Detector 212 is further coupled with interference nuller 217. Communications transmitter 216 is further coupled with communications antenna 218 with detector 212 and with tracker 214.

In general, similar to radar system 100 (FIG. 1A), radar system 200 attempts to at least detect moving objects located at selected locations in a scene. Similar to radar signal generator 102 (FIG. 1A), radar signal generator 202, generates a radar signal. This radar signal may be a continuous wave (CW) signal or a plurality of pulses. When the radar signal is a plurality of pulses, the pulses may be modulated or un-modulated. When the pulses are modulated, each pulse may be modulated with a different modulation scheme. The radar signal generator 202 provides the transmitted radar signal to transmitting array 204, to radar signal processor 210 and to receiver 206. Transmitting array 204 sequentially transmits the radar signal toward selected directions. Similar to radar system 100 of FIG. 1A, when, radar system 200 is employed to detect humans, the radar signal repetition rate is, for example, on the order of seconds and a duty cycle on the order of 1% can be achieved. The duty cycle of the transmitted signal substantially reduces the power dissipation of low energy radar system 200 relative to prior art radars. It is noted that, at least selected ones of transmitters $222_1, 222_2, \ldots, 222_N$ transmit simultaneously, via the respective ones of transmitting antennas $220_1, 220_2, \ldots, 220_N$, signals from the corresponding locations.

The transmitted signal reflects off objects in the scene around low energy radar system 200, back towards low energy radar system 200. Receiver 206 receives, via receiving antenna 208, signals corresponding to reflections of the transmitted signal from the scene. Receiver 206 provides the received signal to radar signal processor 210. After transmitter array 204 transmitted the radar signal and receiver received the reflection of the transmitted radar signal, power controller 215 shuts down radar signal generator 202, transmitting array 204 (and consequently transmitters $222_1$, $222_2, \ldots, 222_N$) and receiver 206 or at least one thereof.

Similar to radar signal processor 114 (FIG. 1A), prior to object detection, radar signal processor 210 determines a clutter map of the scene. During object detection, radar signal processor 210 processes the received signals from receiver 206, determines a scene reflection map and updates the clutter map according to the scene reflection map. As mentioned above, at least selected ones of transmitters $222_1, 222_2, \ldots, 222_N$ may transmit simultaneously, via a respective one of transmitting antennas $220_1, 220_2, \ldots, 220_N$, signals toward all directions in the scene. However, radar signal processor 210 processes the received signals, to determine the received reflection characteristics only from selected locations in the scene (i.e., the selected locations do not necessarily correspond to all of the locations from which the antennas receive the signals). Radar signal processor 210 is also further described below in FIG. 5. It is also noted that transmitter array 204 may transmit to each selected direction and radar signal processor 210 processes the signals received from that selected direction (i.e., transmitter array 204 and radar signal processor 210 alternately operate). Alternatively, that transmitter array 204 sequentially transmits to a group of selected direction (i.e., all of the selected directions or a subset of the selected directions) and radar signal processor 210 processes the signals received from those selected directions.

Radar signal processor 210 provides the determined scene reflection map and the clutter map to detector 212. Radar signal processor 210 provides the determined scene reflection map to interference nuller 217. Similar to detector 116 (FIG. 1A), detector 212 detects objects in the scene and the corresponding locations thereof according to the scene reflection map and the clutter map. Detector 212 provides the detected objects to tracker 214. Similar to tracker 118 (FIG. 1A) tracker 214 tracks the detected objects, and determines the parameters related to these detected objects in the scene. Tracker 214 determines if the detected objects correspond to targets in the scene. Tracker 214 may further classify the targets and determine when and whether these targets correspond to targets of interest. Detector 212 and tracker 214 may store the characteristics of the detected objects, targets and targets of interest in a database (not shown). Tracker 214 and detector 212 provide parameters associated with at least a selected portion of the detected objects to interference nuller 217. Similar to interference nuller 119 (FIG. 1A), interference nuller 217 determines the effect of the interfering objects on the signals received by receiver 206, and consequently the effects of the interfering objects on scene reflection map, at least according to the determined locations of the interfering objects as further explained below in conjunction with FIG. 5. After radar signal processor 210 processed the received signals, detector 212 detected the detected objects in the scene and tracker 214 tracked the detected objects, determined targets and targets of interest in the scene, power controller 215 may shut down processor 209.

According to one alternative, detector 212 provides the information relating to detected objects (e.g., location or signal characteristics or both) to communications transmitter 216. According to another alternative, tracker 214 may also provide information relating to the targets and targets of interest (e.g., target characteristics, classification of the target) to communications transmitter 216. According to yet another alternative, both detector 212 and tracker 216 provide the respective information thereof to communications transmitter 216. Communications transmitter 216 transmits the at least part of the information provided thereto to a control station (not shown) via communications antenna 218. Similarly to communication transmitter 120 (FIG. 1A), communication transmitter 218 is wirelessly coupled with the control station. However, communication transmitter 218 may be coupled with the control station via a wire (e.g., coax cable, twisted pair). After communications transmitter 216 transmitted the data to the control station power controller 215 shuts down communications transmitter 216.

According to one alternative, transmitting, array 204 sequentially transmits the radar signal toward each selected direction and processor 209 processes the received signals from each selected direction. According to another alternative, transmitting array 204 sequentially transmits the radar signal toward a group of selected directions and processor 209 processes the received signals from that group of selected directions. According to yet another alternative, transmitting array 204 sequentially transmits the radar signal toward all of the selected directions and processor 209 processes the received signals from all the selected directions.

Figure 2B:
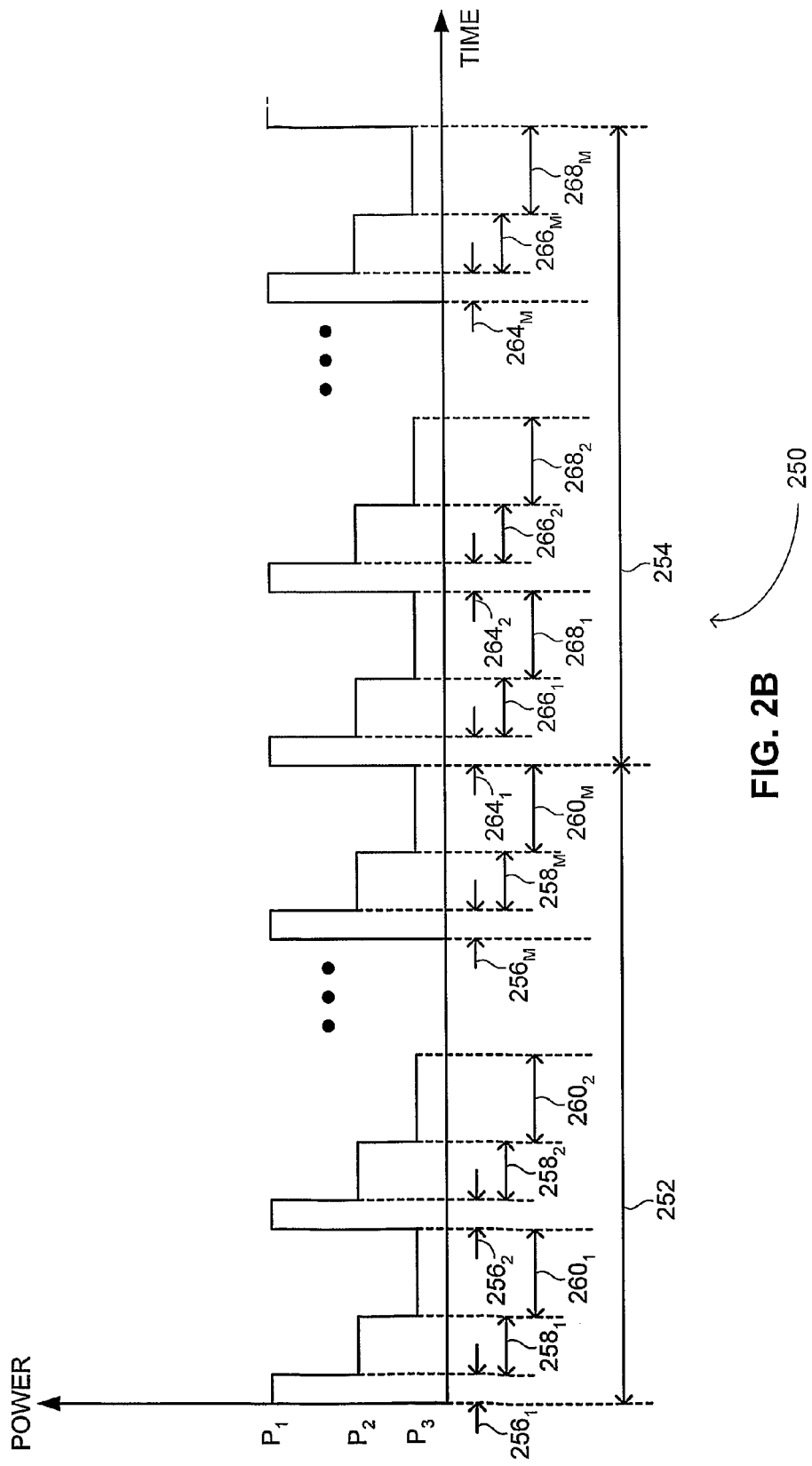
FIG. 2B is a schematic illustration of a power versus time diagram of the low energy radar system of FIG. 2A, in accordance with another embodiment of the disclosed technique.

Reference is now made to FIG. 2B, which is a schematic illustration of a power versus time diagram, generally reference 250, of the low energy radar system 200 of FIG. 2A, in accordance with another embodiment of the disclosed technique. In diagram 250, time-periods 252 and 254 represent the scene scan repetition interval (i.e., each of time periods 252 and 254 represent a cycle in the operation of low energy radar system 200). Time-periods $256_1, 256_2, \ldots, 256_M$ and $264_1, 264_2, \ldots, 264_M$ represent the radar signal transmission and reception periods (i.e., the time required to transmit and receive the signal). Each one of periods $256_1, 256_2, \ldots, 256_M$ and $264_1, 264_2, \ldots, 264_M$ represents the transmission of the radar signal to a selected direction. Alternatively, each one of transmission time-periods $256_1, 256_2, \ldots, 256_M$ and $264_1, 264_2, \ldots, 264_M$ represents the sequential transmission of the radar signal to a group of selected directions (i.e., as mentioned above, transmitting array 204 transmits to all of the selected directions or a subset of the selected directions).

Time-periods $258_1, 258_2, \ldots, 258_M$ and $266_1, 266_2, \ldots, 266_M$ represents the signal processing period. Each one of the signal processing periods $258_1, 258_2, \ldots, 258_M$ and $266_1, 266_2, \ldots, 266_M$ represents the time of operation of processor 209. Time-periods $260_1, 260_2, \ldots, 260_M$ and $268_1, 268_2, \ldots, 268_M$ represent the idle periods in which the power consumption of system 200 is substantially zero. Similar to low energy radar system 100 (FIG. 1A) after the signal transmission and reception period $256_1, 256_2, \ldots, 256_M$ and $264_1, 264_2, \ldots, 264_M$, power controller 215 may shut down radar signal generator 202, transmitting array 204 and consequently transmitters $222_1, 222_2, \ldots, 222_N$ and receiver 206 or a part thereof. After processing time-periods $258_1, 258_2, \ldots, 258_M$ and $266_1, 266_2, \ldots, 266_M$, power controller 215 may shut down processor 209. It is noted that after each idle time-periods $268_1, 268_2, \ldots, 268_M$ and prior to the respective transmission and reception time-periods $264_1, 264_2, \ldots, 264_M$, power controller 215 powers up at least radar signal generator 202, transmitting array 204 (and consequently transmitters $222_1, 222_2, \ldots, 222_N$) and receiver 206, Furthermore, prior to signal processing time-period $266_1, 266_2, \ldots, 266_M$, power controller 215 powers up processor 209.

Figure 3:
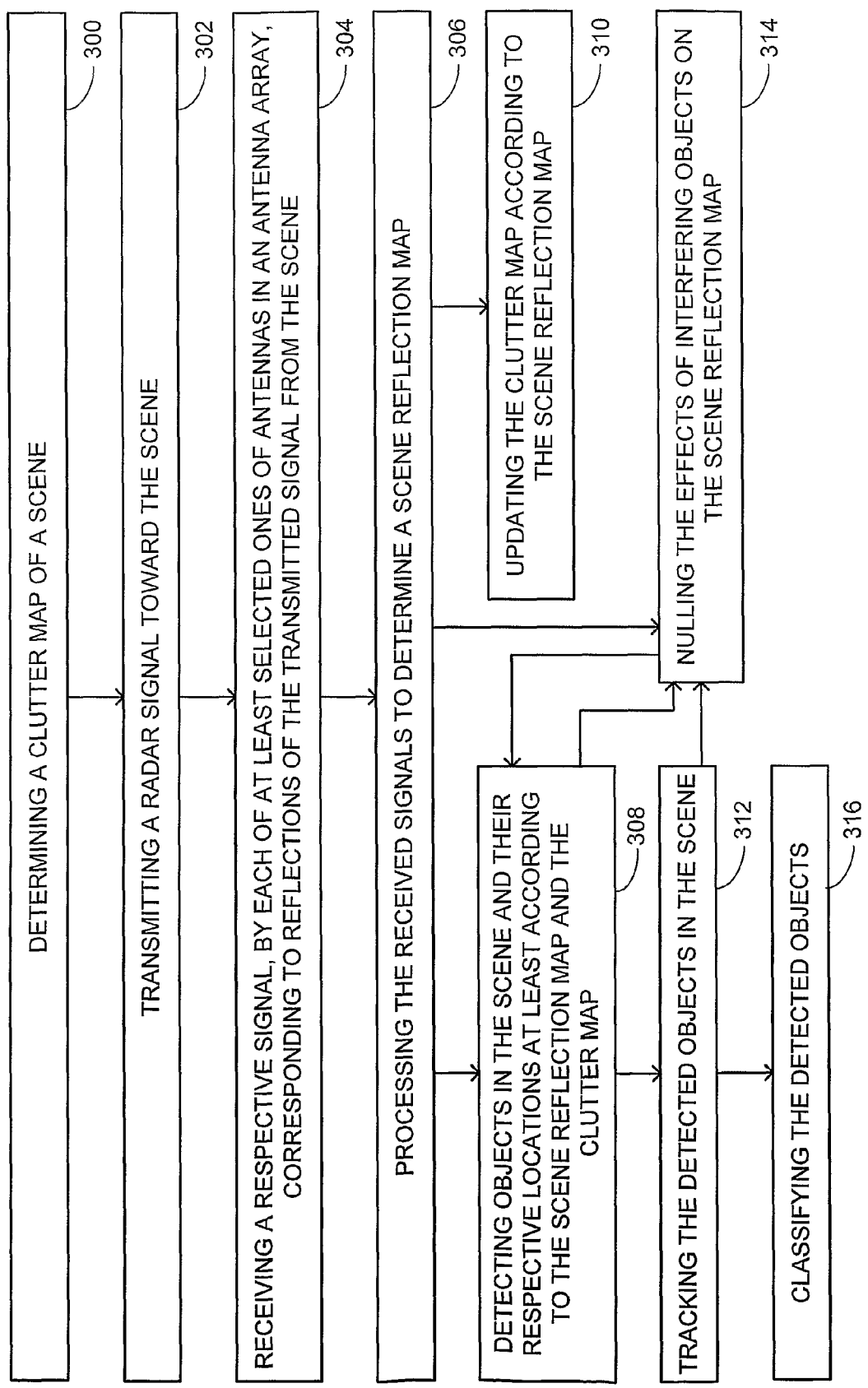
FIG. 3 is a method for detecting objects in a scene, in accordance with a further embodiment of the disclosed technique.

Reference is now made to FIG. 3, which is a schematic illustration of method for detecting objects in a scene, in accordance with a further embodiment of the disclosed technique. In procedure 300, a clutter map of the scene is determined. The clutter map includes the values representing the reflection characteristics of substantially stationary objects located at the selected locations in the scene. The clutter map may be matrix, in which each entry is associated with a corresponding selected location in the scene. Each entry in the matrix includes a set of values representing the clutter reflection characteristics respective of that location. Each entry in the clutter map may further include statistical characteristics associated with the clutter reflection characteristics. Each entry in the clutter map may further include detection thresholds for each clutter reflection characteristics.

In procedure 302, a radar signal is transmitted toward a scene. This radar signal may be a CW modulated signal (e.g., sine wave, chirped) or a plurality of pulses. The pulses may be modulated or un-modulated pulses. With reference to FIG. 1A, signal generator 102 generates a radar signal and transmitter 104 transmits this radar signal via transmitting antenna 106.

In procedure 304, a respective reflected signal, corresponding to reflections of the transmitted signal from the scene is received by each of at least selected ones of antennas in an antenna array. With reference to FIG. 1A, at least selected ones of receivers $112_1$, $112_2$, . . . , $112_N$ receives, via the corresponding one of receiving antennas $110_1$, $110_2$, . . . , $110_N$, a respective signal corresponding to reflections of the transmitted signal from the scene.

In procedure 306, the received signals are processed to determine a scene reflection map. The scene reflections map includes the values representing the reflection characteristics of all of the objects (i.e., both stationary and moving objects) located at the selected locations in the scene. Similar to the clutter map, the scene reflection map may be a matrix. Each entry in the matrix is associated with a corresponding selected location (i.e., a corresponding selected range and a corresponding selected direction) in the scene. Each entry in the matrix includes a set of values representing the reflection characteristics from the selected location corresponding to that entry. With reference to FIG. 1A, radar signal processor 114 determines a scene reflections map. The method proceeds to procedures 308, 310 and 314.

In procedure 308, objects in the scene are detected at least according to the scene reflection map and the clutter map. For example, the energy levels in the clutter map are subtracted from the corresponding energy levels in the scene reflection map resulting in an energy difference map. Each entry in the energy difference map exceeding a threshold associated with energy level in that entry is determined as a detected object in the scene. With reference to FIG. 1A, detector 116 detects objects in the scene at least according to the scene reflection map and the clutter map. From procedure 308, the method proceeds to procedures 312 and 314.

In procedure 310, the clutter map is updated according to the scene reflection map. For example, a portion of the values in the clutter map are determined, for example, as a long term weighted average of the corresponding values in the scene reflections map. With reference to FIG. 1A, radar signal processor 114 updates the scene reflection map.

In procedure 312 the detected objects in the scene are tracked. Whether these objects correspond to targets is also determined. As mentioned above a target refers herein to a group of previously and currently detected objects, associated to a single moving detected object in the scene, which exhibits at least a selected group of target characteristics. With reference to FIG. 1A, tracker 118 tracks the detected objects. From procedure 312, the method proceeds to procedures 314 and 316.

In procedure 314 the effects of interfering objects, on the scene reflection map, are alleviated. Initially the effect of the interfering objects on the signals received by the receiver or the receivers is determined. Consequently, the effects of the interfering objects on the scene reflection map at least according to the locations of the interfering objects. With reference to FIG. 1A, interference nuller 119 nulls the effects of interfering objects on the scene reflection map. The method returns to procedure 308.

In procedure 316, the targets are classified. Thus, targets corresponding to targets of interest are determined. With reference to FIG. 1A, tracker 118 classifies the detected targets and determines if these targets correspond to targets of interest.

What follows is an example of the operation of the low energy radar of the disclosed technique. As mentioned above, the low energy radar system of the disclosed technique determines the location of detected objects in the scene according to the scene reflection map and a clutter map. The clutter map represents the values of the parameters of received signals reflected from substantially stationary objects in the scene. A value in the clutter map is determined, for example, according to a long term weighted average of one value in scene reflection maps, and is updated according to newly determined scene reflection maps. Objects that entered the scene at a given moment in time and then became stationary (e.g., a parked car) become part of the clutter. Reference is now made to FIGS. 4A, 4B, 4D, and 4F, which are schematic illustrations of a scene, generally referenced 400, where low energy radar 402 is used, in accordance with a further embodiment of the disclosed technique. In scene 400, ranges spreading radially out from low energy radar 402 are numbered from 1 to 5. These numbers may represent absolute values (e.g., the value 3 may represent 3 kilometers) or normalized values. Furthermore, φ represents a direction angle in degrees. The direction of zero degrees in the figures was arbitrarily chosen. Scene 400 includes forest 404 at the direction of 45 degrees and range two. In the following description of FIGS. 4A-4G, a location in the scene is denoted by two values in square brackets. The first value corresponds to the direction angle and the second to the range. Thus, for example, the location of forest 404 is denoted [45°, 2].

Table 1 represents an exemplary clutter map constructed by low energy radar 402 transmitting a chirped modulated CW signal and receiving signals with an array including omni-directional receiving antennas. In Table 1, the rows correspond to ranges and the columns to directions. Each entry in each row corresponds to the reflection characteristics of location (i.e., direction and range) corresponding to the entry. In Table 1, only the values corresponding to the average energy levels of composite signals associated with the respective locations, are listed. It is noted that these values are brought herein as an example only and do not correspond to real values. It is further noted that the clutter map might include other parameters, which are not presented. Table 1 includes five selected ranges (i.e., the rows) and eight selected directions (i.e., the columns). It is noted that the value corresponding to range 2 and the direction of 45 degrees is substantially higher than the other values in Table 1. This value represents the average received energy level of the composite signal associated with the location of forest 404.

TABLE 1

| | −180° | −135° | −90° | −45° | 0° | 45° | 90° | 135° |
|---|---|---|---|---|---|---|---|---|
| 1 | 0.10 | 0.13 | 0.15 | 0.20 | 0.05 | 0.03 | 0.1 | 0.17 |
| 2 | 0.20 | 0.04 | 0.14 | 0.12 | 0.1 | 3.00 | 0.18 | 0.19 |
| 3 | 0.10 | 0.08 | 0.19 | 0.06 | 0.07 | 0.11 | 0.10 | 0.20 |
| 4 | 0.00 | 0.01 | 0.04 | 0.15 | 0.09 | 0.17 | 0.16 | 0.08 |
| 5 | 0.05 | 0.13 | 0.17 | 0.20 | 0.09 | 0.04 | 0.15 | 0.01 |

Table 1 is brought herein as an example only. According to the disclosed technique, the number of selected ranges and directions may be larger or smaller. The selected locations are determined according to characteristics of low energy radar of the disclosed technique (e.g., range and direction resolution) and according to system requirements (e.g., the system may be required to detect objects only at two specified directions). Furthermore, as mentioned above, each entry in the clutter map may include additional set of values corresponding of the reflection characteristics respective of the location corresponding to the entry.

During object detection, low energy radar system 402 determines a scene reflection map. As mentioned above, each entry in the scene reflection map is associated with a selected location (i.e., with a selected range and with a selected direction) regardless if objects are present in these selected locations or not. Each entry includes reflection characteristics of the selected location corresponding to that entry. Low energy radar system 402 determines the reflection characteristics corresponding to each entry in the scene reflection map by orienting in a selected direction and range.

When the transmitted radar signal is a chirped signal, low energy radar system 402 determines the range from which reflections of the transmitted signal according to differences between the frequency of the received signals and the frequency of the transmitted chirped signal at the time of arrival of the received signals (i.e., radar system 402 still transmits the chirped signal while receiving reflections from the scene). Since the frequency of the chirped signal changes with time, the differences between the frequency of the received signals and the frequency of transmitted chirped signal is related to the difference between the time the transmitted signal was transmitted and the time the received signal was received, and consequently to the distance the signal traveled. Thus, all the received signals, exhibiting the same frequency, correspond to reflections of the transmitted signal from the same range.

For each range, low energy radar system 402 orients in a selected direction, by adjusting the delay of each received signal from a corresponding antenna, such that the signals received by all of the receiving antennas from the selected direction constructively interfere (i.e., in the case of a CW signal, the phase corresponds to delay). Thus, low energy radar system 402 defines an elongated area, known as the main lobe of antenna beam pattern, substantially in the selected direction. It is however noted that when adjusting the phase of each received signal from each corresponding receiving antenna, lobes other than the main lobe, known as side lobes, may be created in directions other than the selected direction. Thus, low energy radar system 402 may receive reflections originating from objects located in those other directions of the side lobes. Low energy radar system 402 determines the reflection characteristics corresponding to each entry in the scene reflection map by determining a range map for each selected location (i.e., range and direction). This range map includes the reflection characteristics of a plurality of directions at the selected range corresponding to the entry, when low energy radar system 402 is oriented in the direction corresponding to the entry. Each entry is determined according to the integral of the range map corresponding thereto.

Figure 4A:
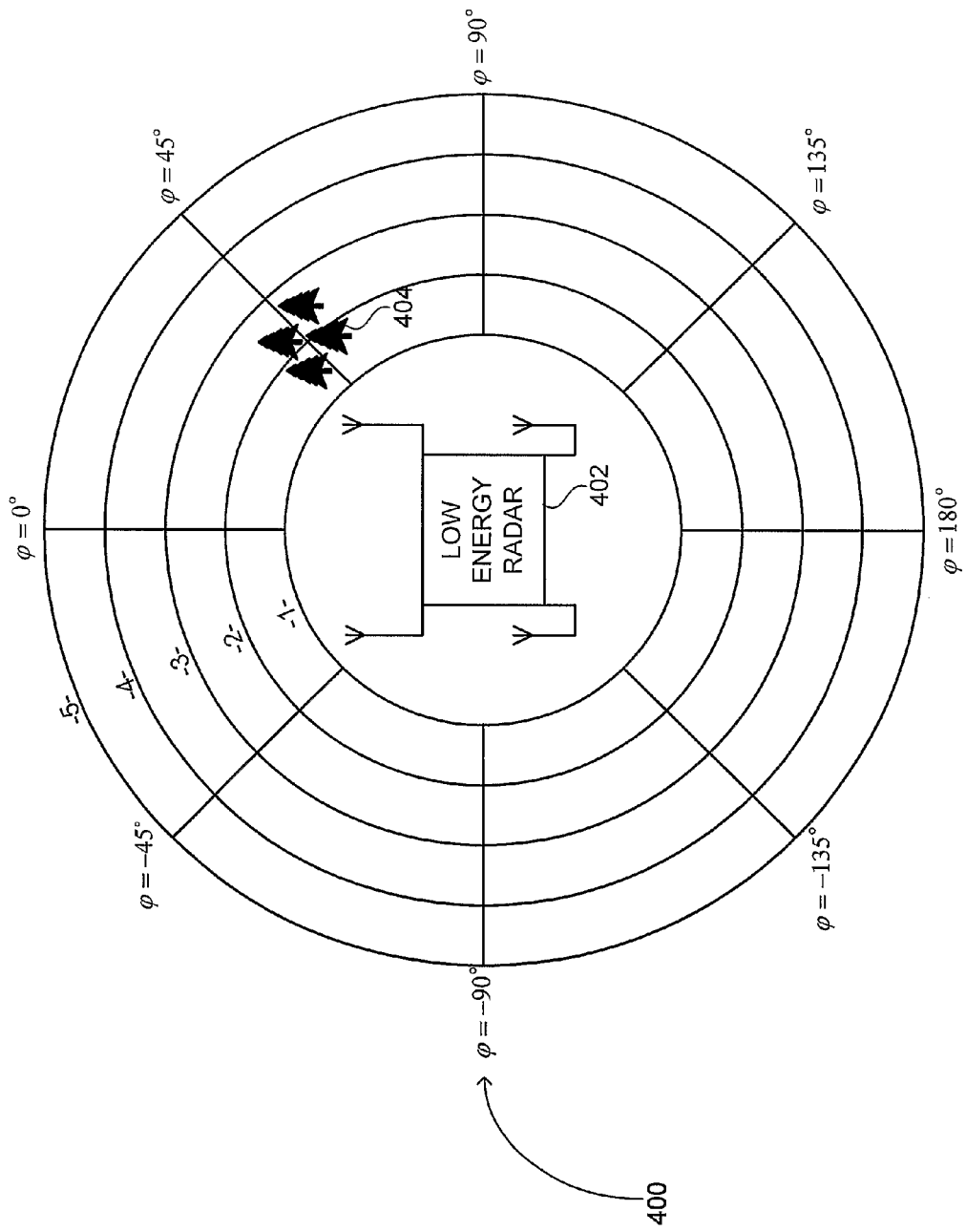
FIGS. 4A, 4B, and 4D, and 4F are schematic illustrations of a scene where a low energy radar is used, in accordance with another embodiment of the disclosed technique.
Figure 4B:
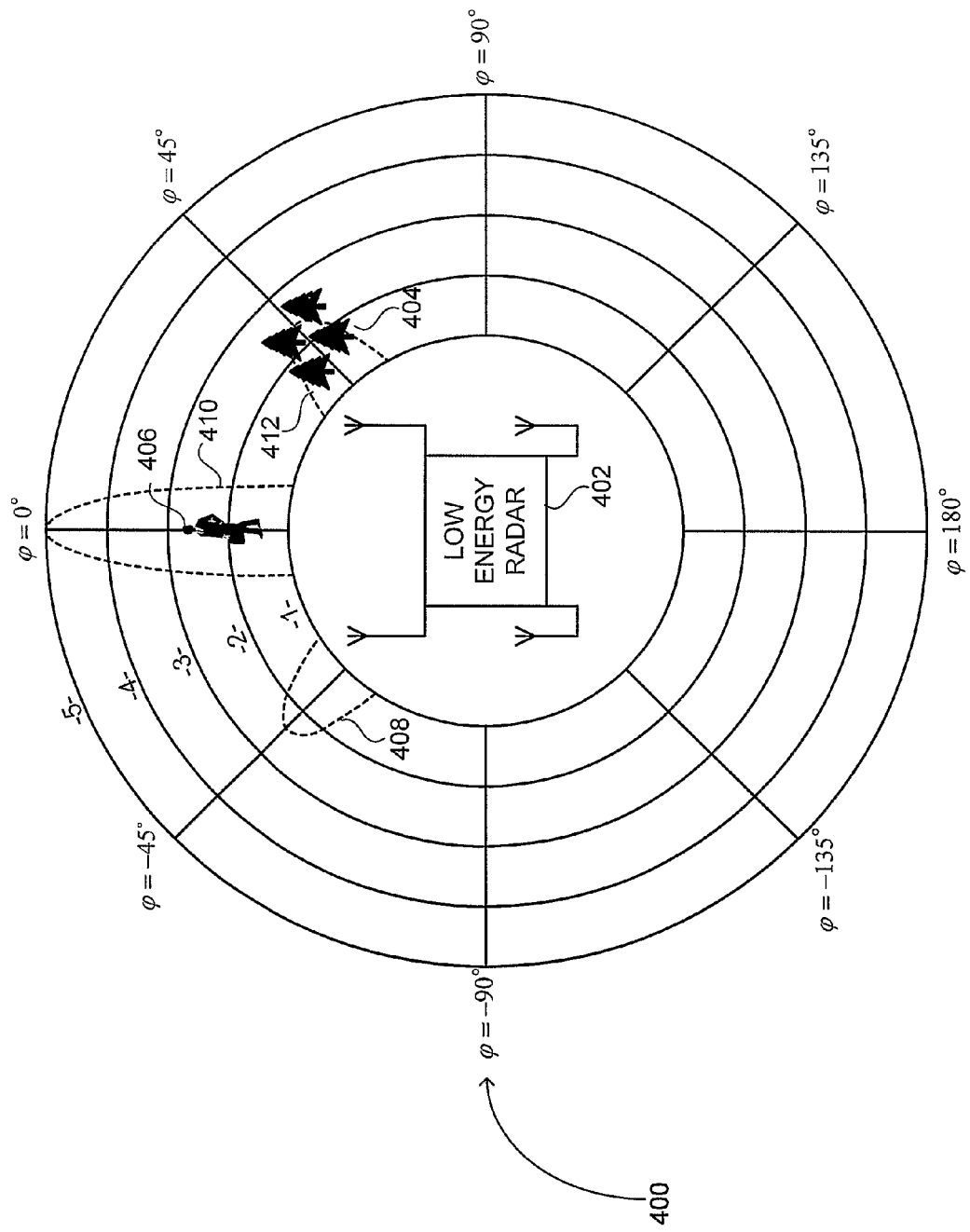

In FIG. 4B, a person 406 entered scene 400 at location [0°, 2]. Furthermore, low energy radar 402 orients toward an area defined by main lobe 410, substantially in the direction of zero degrees. Thus, low energy radar 402 receives reflections from person 406. However, when low energy radar 402 is oriented toward the area defined by the main lobe 410, in the direction of zero degrees, additional side lobes, labeled 408 and 412, are also generated. Due to side lobe 412, reflections from forest 404 are also received from the direction of 45 degrees.

Figure 4C:
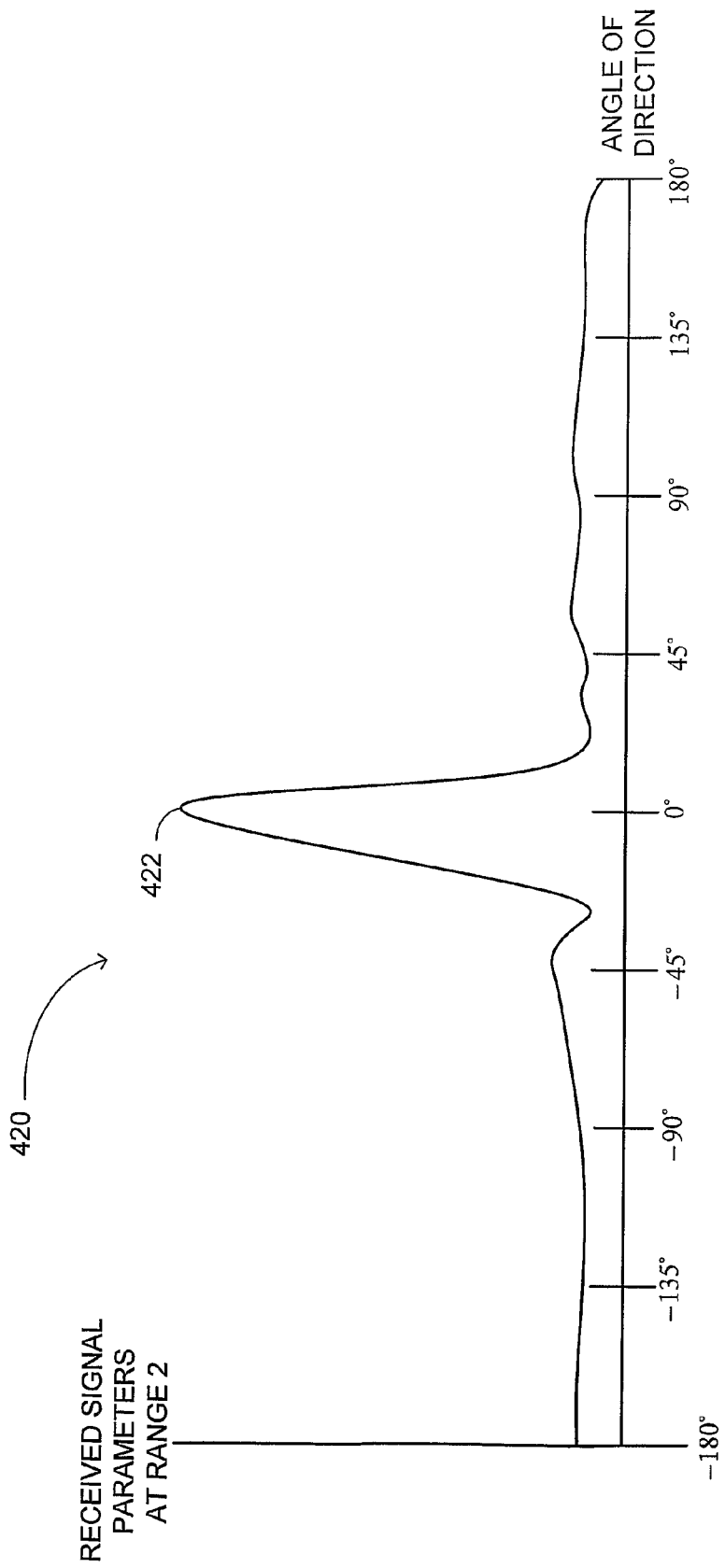
FIG. 4C, which is a schematic illustration of a range map, generally reference 420, in accordance with a further embodiment of the disclosed technique.

Reference is now made to FIG. 4C, which is a schematic illustration of a range map based on the scene in FIG. 4B, generally reference 420, in accordance with a further embodiment of the disclosed technique. Range map 420 depicts the received signal parameters versus direction angles for range two. Range map 420 includes peak 422 corresponding to the energy level of the composite signal associated with location [0°, 2] where person 406 (FIG. 4B) is located. Accordingly, the entry in the scene reflection map corresponding to range two and the direction of zero degrees is determined according to the integral of range map 420. Similarly, low energy radar 402 constructs a range map for each selected location and determines the entries of the scene reflection map accordingly.

It is noted that range map 420 does not include a peak at the direction of 45 degrees where forest 404 is located. In general, low energy radar system 402 attempts to maximize the ratio of the gain from the selected direction (e.g., the direction of zero degrees in FIG. 4B) to the weighted gain (i.e., weighted with the clutter in the clutter map at the relevant locations) from the directions other than the selected direction (e.g., the gain of side lobe 412 in FIG. 4B is minimized to compensate for the signal reflecting from location [45°, 2] which include forest 404). In other words, for each selected range, low energy radar system 402 attempts to maximize the Signal To Clutter Ratio (SCR) for each direction φ. Maximizing SCR(φ) is equivalent to maximizing the following term:

$$\max\left\{\frac{G(\varphi, r)}{\int_{\theta \neq \varphi} G(\theta, r) \cdot S(\theta, r) d\theta}\right\} \quad (1)$$

where $G(\phi,r)$ represents the beamforming gain at an angle $\phi$ and range r (i.e., the gain of the main lobe oriented in direction $\phi$ and at range r), $G(\theta,r)$ represents the beamforming gain at an angle $\theta$ (where $\theta$ does not equal $\phi$) and range r (i.e., gain of side lobes at range r), and $S(\theta,r)$ represents the reflections from clutter in the scene at angle $\theta$ and range r.

Table 2 represents an exemplary scene reflection map. Similar to Table 1, the rows in Table 2 correspond to ranges and the columns correspond to directions. Table 2 includes five selected ranges and eight selected directions. Table 2 lists only the values corresponding to the energy levels of the composite signals corresponding to the locations in table 2. Furthermore, this values in table 2 are brought herein as examples only and do not correspond to real values. It is noted that the value corresponding to locations [0°, 2] and [45°, 2] are substantially higher than the other values in the table. The value corresponding to location [0°, 2] corresponds to person 406. The value corresponding to location [45°, 2] corresponds to forest 404.

TABLE 2

|   | −180° | −135° | −90° | −45° | 0° | 45° | 90° | 135° |
|---|---|---|---|---|---|---|---|---|
| 1 | 0.10 | 0.14 | 0.18 | 0.19 | 0.05 | 0.03 | 0.1 | 0.17 |
| 2 | 0.20 | 0.04 | 0.12 | 0.12 | 7.00 | 3.01 | 0.18 | 0.19 |
| 3 | 0.10 | 0.07 | 0.19 | 0.06 | 0.05 | 0.11 | 0.11 | 0.20 |
| 4 | 0.01 | 0.01 | 0.04 | 0.16 | 0.09 | 0.17 | 0.16 | 0.09 |
| 5 | 0.05 | 0.13 | 0.16 | 0.20 | 0.09 | 0.03 | 0.15 | 0.01 |

As mentioned above, low energy radar system 402 detects objects according to the scene reflection map (e.g., Table 2)

and the clutter map (e.g., Table 1). For example, low energy radar system 402 may subtracts the energy levels in clutter map from the energy levels in the scene reflection map, thus subtracting the effects of forest 404 on the scene reflection map.

Figure 4D:
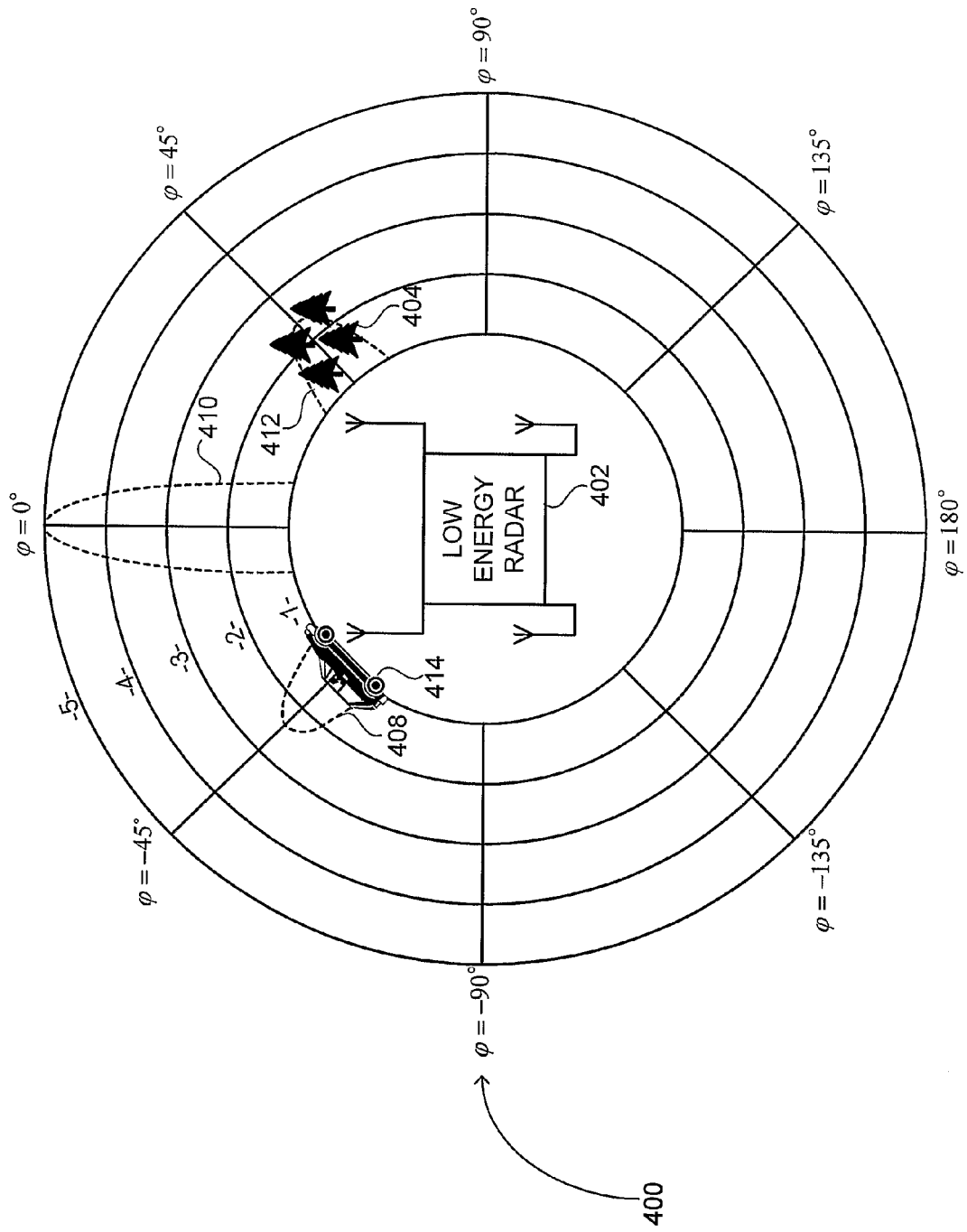
Figure 4E:
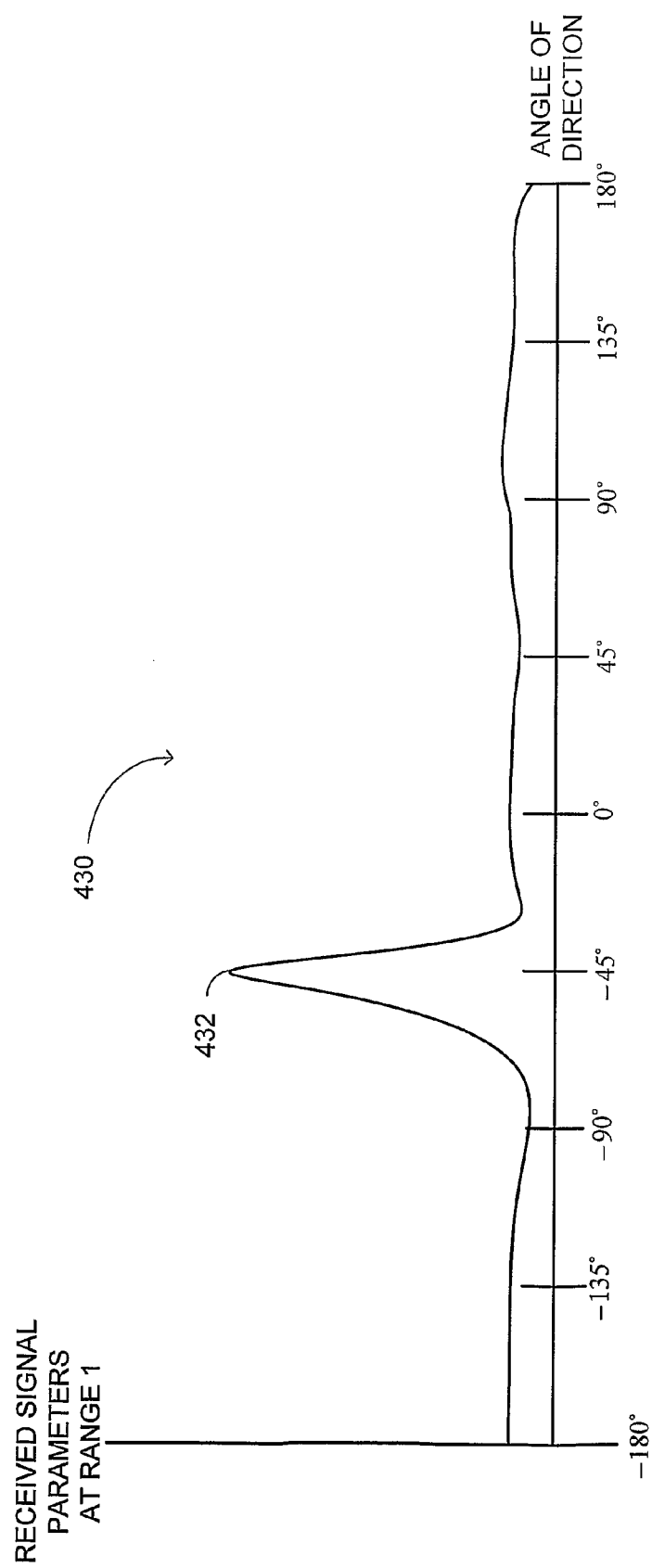
FIG. 4E is a range map generated for a location based on the scene in FIG. 4D in accordance with another embodiment of the disclosed technique.

When orienting in a selected direction and range, reflections from non stationary objects in the scene (i.e., not clutter), located at the selected range and in the directions covered by the side lobes, may create peaks in the range maps associated with the selected location, thereby causing erroneous detection. In FIG. 4D, low energy radar 402 is oriented in the direction of zero degrees and range one. Furthermore, car 414 has entered the area covered by side lobe 408 at range one (i.e., the location of car 414 is [−45°, 1]). Thus, reflections from car 414 are also received. Reference is now made to FIG. 4E, which is a range map, generally referenced 430, generated for location [0°, 1] based on the scene in FIG. 4D, in accordance with another embodiment of the disclosed technique. Range map depicts the received signal parameters versus direction angles for range one. This range map includes a peak 430 corresponding to the received energy from car 414. Consequently, low energy radar system 402 may mis-detect that an object, exists at location [0°, 1]. Thus, car 414 interferes with low energy radar system 402 when low energy radar system 402 attempts to detect objects in range one and direction of zero degrees. Accordingly, low energy radar system 402 attempts to determine the effects of each detected object on all the other range maps (i.e., the range maps corresponding to directions different from the one of the detected object, at least according to the locations of the detected objects). For example, low energy radar system 402 attempts to determine the effects of car 414 detected at location [−45°, 1] on the range map corresponding to location [0°, 1]. Low energy radar system 402 constructs the range map while attenuating the reflections from car 414.

Figure 4F:
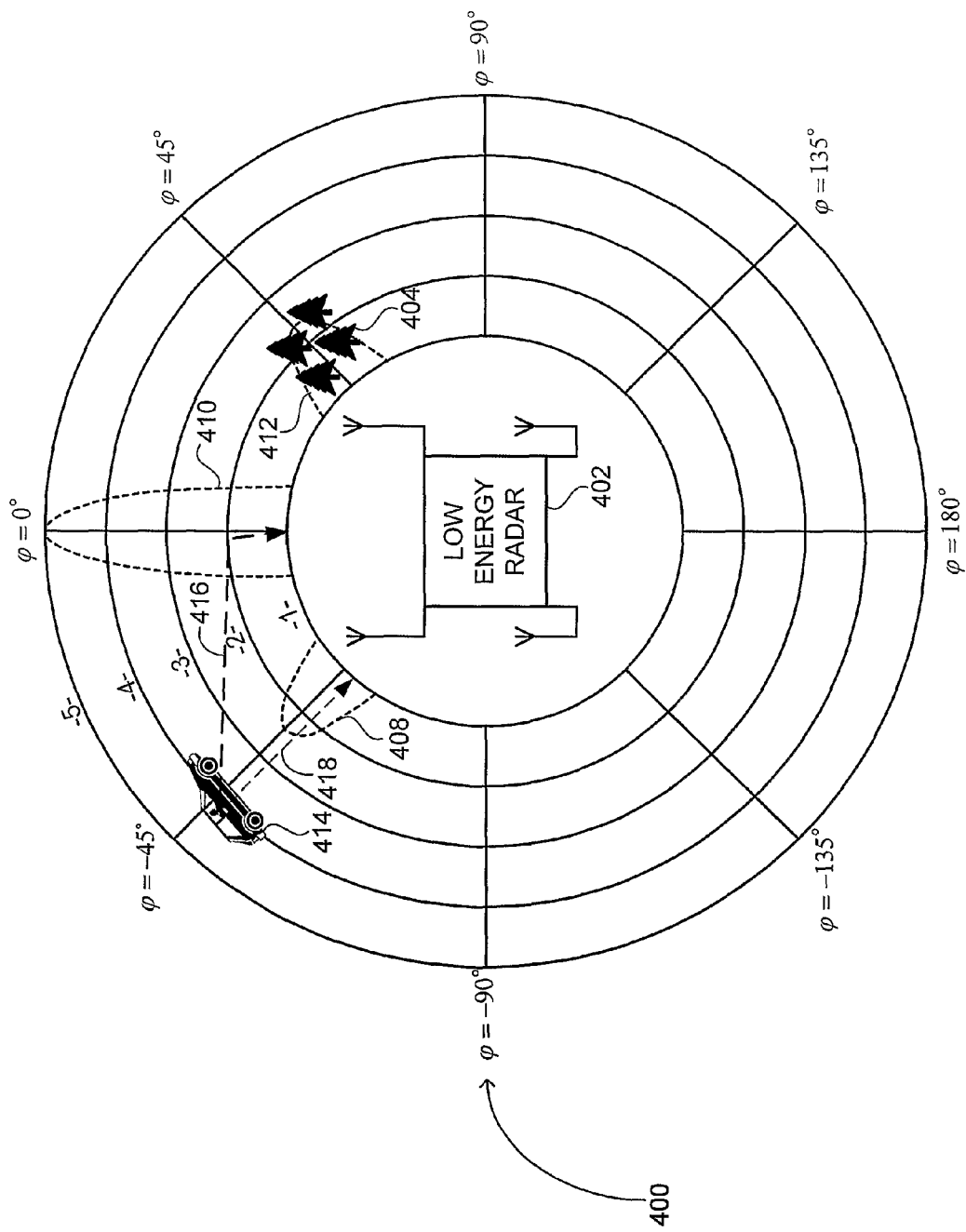
Figure 4G:
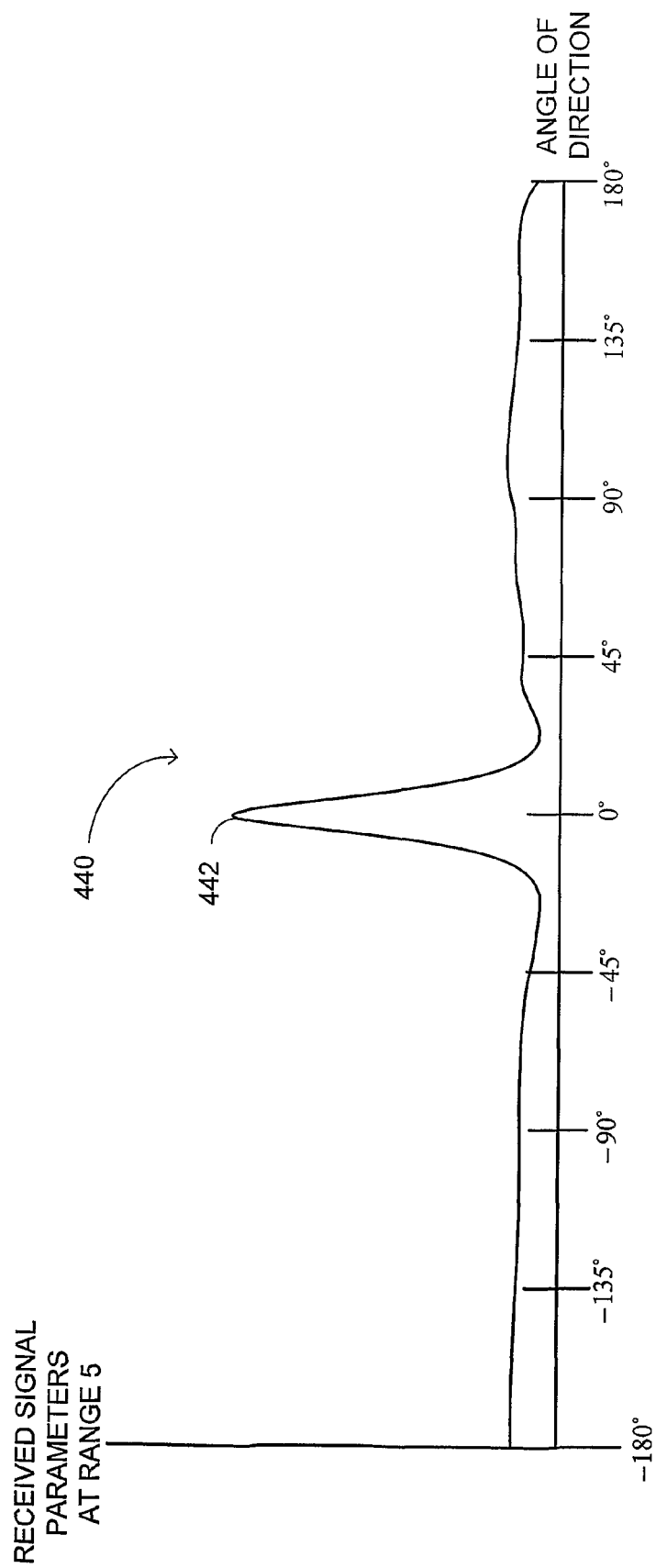
FIG. 4G, which is a range map generated for a location based on the scene in FIG. 4F in accordance with a further embodiment of the disclosed technique.

When orienting in a selected direction and range, multipath reflections may create a peak in the range map associated with the selected direction, thereby causing erroneous detection. In FIG. 4F, car 414 moved to location [−45°, 4]. However, the transmitted signal may reflect of car 414 toward a reflector located substantially at location [0°, 1]. This reflector reflects the signal reflected of car 414 toward low energy radar system 402, thereby creating a multipath as designated by dashed line 416 (i.e., as opposed to direct path designated by dashed line 418). Thus, car 414 may be mis-detected as located at location, for example, [0°, 5] (i.e., due to the length of the multipath). Reference is now made to FIG. 4G, which is a range map, generally referenced 440, generated for location [0°, 5] based on the scene in FIG. 4F, in accordance with a further embodiment of the disclosed technique. Due to the multipath reflection, range map 440 includes a peak 442 at the direction of zero degrees. Thus, low energy radar system 402 may mis-detect that an object, referred to as 'ghost object', exists at the location [0°, 5]. A 'ghost target' refers herein to a group of previous and current detected ghost objects. Low energy radar system 402 alleviates the interference caused by these ghost objects by attempting to determine which targets, if any, exhibit correlation between the target characteristics thereof (e.g., the velocity of the target, the direction of motion of the target) and determining which targets corresponds to the real detected object (e.g., according to average energy levels of the composite signals from detected objects associated with the targets).

Figure 5:
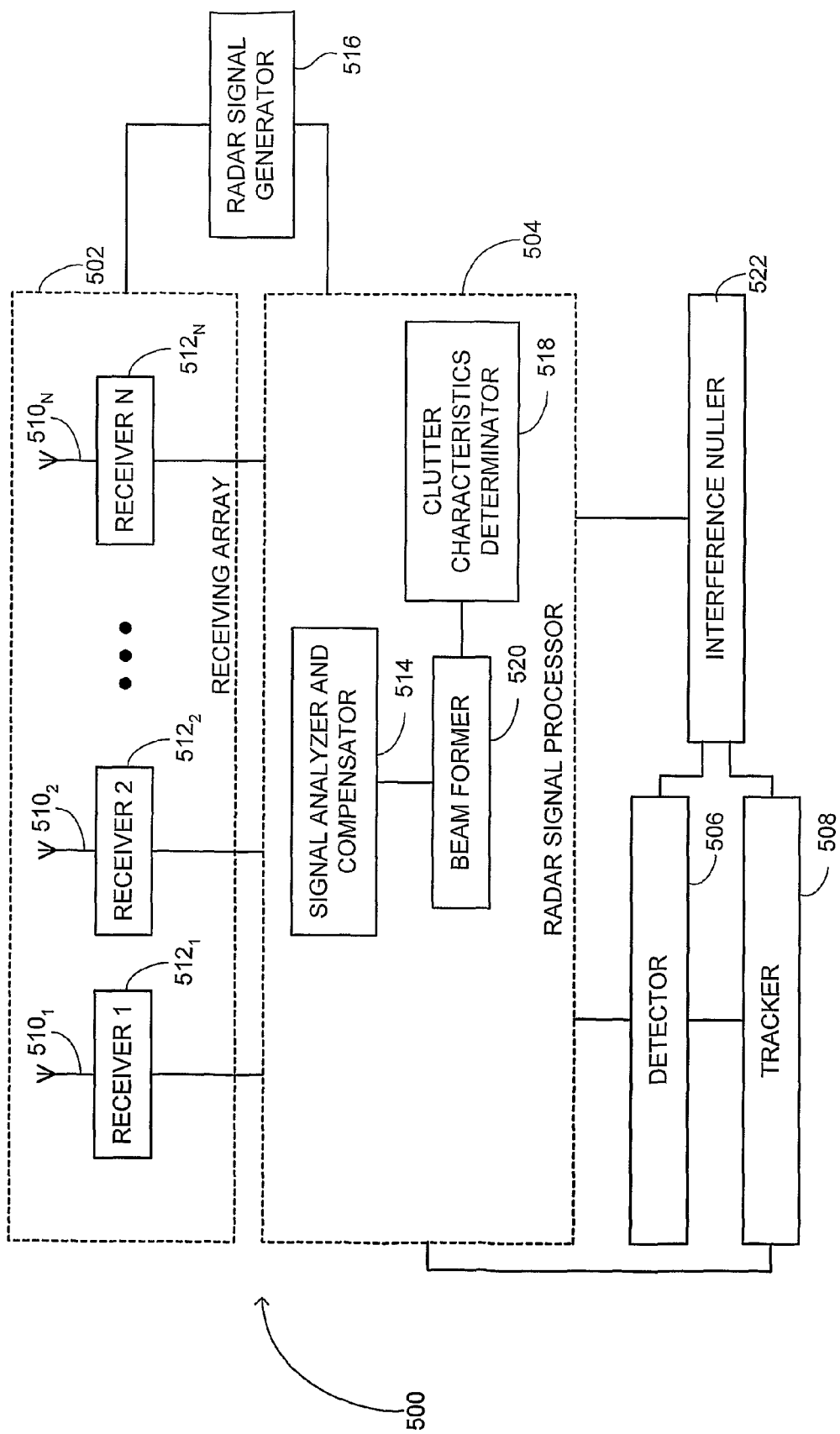
FIG. 5 is a schematic illustration of low energy radar constructed and operative in accordance with another embodiment of the disclosed technique.

Reference is now made to FIG. 5, which is a schematic illustration of low energy radar, generally reference 500, constructed and operative in accordance with another embodiment of the disclosed technique. Radar 500 includes a receiving array 502, a radar signal generator 516, a radar signal processor 504, a detector 506, a tracker 508 and an interference nuller 522. Receiving array 502 corresponds to receiving array 108 in FIG. 1A and includes a plurality of receiving antennas $510_1, 510_2, \ldots, 510_N$ each coupled with a corresponding one of a plurality of receivers $512_1, 512_2, \ldots, 512_N$. The relative positions between antennas $510_1, 510_2, \ldots, 510_N$ in receiving array 502 are known. Radar signal processor 504 corresponds to radar signal processor 114 (FIG. 1A) and to radar signal processor 210 (FIG. 2A). Radar signal processor 504 is coupled with each of receivers $512_1, 512_2, \ldots, 512_N$ with detector 506, with radar signal generator 516, with tracker 508 and with interference nuller 522. Radar signal generator 516 is further coupled with receiving array 502. Detector 506 is further coupled with tracker 508 and with interference nuller 522. Interference nuller 522 is further coupled with tracker 508.

Radar signal processor 504 includes a signal analyzer and compensator 514, a clutter characteristics determinator 518 and a beam former 520. Beam former 520 is coupled with signal analyzer and compensator 514 and with a clutter characteristics determinator 518.

Each one of receivers $512_1, 512_2, \ldots, 512_N$ receives, via a respective one of receiving antennas $510_1, 510_2, \ldots, 510_N$, the reflections of a transmitted radar signal from a radar signal generator 516 (not shown). Each one for receivers $512_1, 512_2, \ldots, 512_N$ provides the received signal to radar signal processor 504. Radar signal processor 504 provides the received signals to signal analyzer and compensator 514. Signal analyzer and compensator 514 analyzes the received signals and corrects the received signals to overcome deficiencies and changes in the receiving channel such as deficiencies in receiving array 502 (e.g., non-linearities and frequency response of receiving antennas $510_1, 510_2, \ldots, 510_N$ and receivers $512_1, 512_2, \ldots, 512_N$), time dependent changes (e.g., aging of electronic component, mechanics deformations) and environmental changes (e.g. operating temperature, operating moisture). For example, when the transmitted radar signal is a chirped signal, signal analyzer and compensator 514 may measure the frequency difference between the signal transmission time and the reception times of the received signals in each one of receivers $512_1, 512_2, \ldots, 512_N$, according to differences between the frequency of the received signals and the frequency of transmitted signal at the time of arrival of the received signals (i.e., radar system 500 still transmits the chirped signal while receiving array 502 receives reflections from the scene). The difference between the signal transmission time and the reception times of each received signal determines the range from which the reflection was received. It is noted that the respective difference between the frequency of the received signals and the frequency of the transmitted signal at the time of arrival of the received signals may alternatively be determined by each one of receivers $512_1, 512_2, \ldots, 512_N$. Alternatively, when, for example, transmitted pulses are used, signal analyzer and compensator 514 determines the difference between the pulse transmission time and the pulse arrival time. Accordingly, radar signal processor 504 determines the range from which the received signals were reflected. Furthermore, signal analyzer and compensator 514 compensates for physical phenomenon in system 500 such as coupling between receiving antennas of $510_1, 510_2, \ldots, 510_N$, cross talk between receivers $512_1, 512_2, \ldots, 512_N$, coupling between transmitting antenna and receiving antennas of $510_1, 510_2, \ldots, 510_N$, effects of objects (metallic or non—e.g., radar stand) on the receiving antennas $510_1, 510_2, \ldots, 510_N$.

As mentioned in the above example described in conjunction with FIGS. 4A-4G, radar signal processor 504, for each location (i.e., range and direction), attempts to maximize the ratio between the gain of the main lobe to the selected direction and the collected clutter from all the other directions (i.e., due to side lobes), such that the effect of the clutter from all the other directions on the composite signal are minimized. To that end, a clutter characteristics determinator 518 determines the clutter map. The clutter map includes the values representing the reflection characteristics of substantially stationary objects located at the selected locations in the scene (e.g., trees, houses, parked cars). The clutter map may be a matrix, in which each entry is associated with a corresponding selected location in the scene. Each entry in the matrix includes a set of values representing the clutter reflection characteristics respective of that location. These clutter reflection characteristics include, for example, the average received energy level of the composite signal received from the location. Each entry in the clutter map may further include statistical characteristics associated with the clutter reflection characteristics. These statistical characteristics include, for example, the statistical moments, such as the second (i.e., the variance) and the fourth moments of the clutter reflection characteristics at each location in the scene. Each entry in the clutter map may further include detection thresholds for each clutter reflection characteristics. Clutter characteristics determinator 518 determines a detection threshold for each selected location (i.e., for each selected direction and range) in the scene, at least according to values of the clutter reflections characteristics included in the clutter map. For example, the threshold associated with the energy level of the composite signal associated with the location in the scene (e.g., range two and the direction of 45 degrees, in FIG. 4A, where forest 404 is located) may have a detection threshold which is set to twice the variance of the energy level of the composite signal associated with this location above the average received energy level form that location. Thus, referring back to FIGS. 4A and 4B, the reflection from forest 404 are not detected as a detected object since the reflections from forest 404 generally result in received energy level below the threshold that clutter characteristics determinator 518 determines for range two and the direction of 45 degrees. The thresholds, which may be included as values in the clutter map, may be dynamically updated when the clutter map is updated. Clutter characteristics determinator 518 may further determine a detection probability function associated with each entry in the clutter map according to the clutter reflection characteristics associated with each location. For example, the probability density function of the energy levels of the composite signal may be determined according to a histogram of the values of these energy levels. A portion of the values in the clutter map may be determined, for example, according to a long term weighted average of corresponding values in the scene reflections maps. Clutter characteristics determinator 518, provides the updated clutter map to detector 506.

Similarly to as described above, during object detection, beam former 520 determines a scene reflection map. As mentioned above the scene reflections map includes the values representing the reflection characteristics of all of the objects located at the selected locations in the scene. The scene reflection map may be a matrix. Each entry in the matrix is associated with a corresponding selected location in the scene. Each entry in the matrix includes a set of values representing the reflection characteristics of the selected location corresponding to that entry. The selected locations are determined according to characteristics of low energy radar and according to system requirements. Beam former 520 determines the reflection characteristics corresponding to each entry by determining a range map for each selected location (i.e., range and direction). This range map includes the reflection characteristics of a plurality of directions at the selected range corresponding to the entry, when low energy radar system 402 oriented in direction corresponding to the entry. Similarly to as mentioned above, beam former 520 orients in a selected direction by adjusting the delays of each received signal from each antenna, such that the signals received by all of the receiving antennas from the selected direction interfere constructively, thereby defining a main lobe of antenna beam pattern, substantially in the selected direction. Radar signal processor provides the scene reflections map to detector 506 and to interference nuller 522.

Similar to as mentioned above, detector 506 detects objects in the scene and the locations thereof according to the scene reflection map and the clutter map. For example, detector 506 subtracts the average energy levels in clutter map from the energy levels in scene reflection map to determine an energy difference map. Detector 506 further determines which entry in the energy difference map exceeds a respective threshold (i.e., each entry is associated with a respective threshold). When the difference energy level of an entry in the energy difference map exceeds the respective threshold thereof, than, detector 506 determines that a detected object exists in the location corresponding to that entry. Similar to the energy difference map, detector 506 may determine a composite delay difference map. When the difference delay of an entry in the composite delay difference map exceeds the respective threshold thereof, than, detector 506 determines that a detected object exists in the location corresponding to that entry. Thus, for example, when transmitting a CW signal a human moving in proximity to a house may cause a change in the phase of the received signals from the location at which the house is located. Thus, the human may be detected. Detector 506 provides the detected objects and the corresponding locations thereof to tracker 508 and to interference nuller 522. Alternatively, detector 506 may determine the probability that an non-stationary object exist at a selected location according to the scene reflections map, the statistical characteristics of the clutter reflection characteristics and a detection probability function (i.e., the detection probability function is pre-determined or determined by clutter characteristics determinator 518). For example, for each location in the scene, the average energy level and the variance of the energy level determine a normal statistical distribution. Detector 506 determines the probability of that the received energy from each location corresponds to a reflection from a non-stationary object.

Tracker 508 tracks the detected objects, and determines if the detected objects correspond to targets in the scene. Furthermore, targets are set as a group of previous and current detected objects, associated to a single moving detected object in the scene, which exhibits at least a selected group of target characteristics. These target characteristics may be, for example, the target track (i.e., previous and current locations of the moving detected object associated to the target in the scene), the estimated velocity of the moving detected object associated to the target in the scene and the estimated direction of motion of the moving detected object associated to the target in the scene. The target characteristics may also be the previous and current received signal characteristics of the location of moving detected object associated to the target in the scene. Furthermore, tracker 508 stores a plurality of probable tracks. Tracker 508 assigns a detected object to a corresponding target according to a match between the target characteristics and the detected object characteristics. Tracker 508 may further classify the targets (e.g., humans, cars) and determine when these targets correspond to targets of interest.

When adjusting the delay of each received signal from each receiving antenna to create a main lobe in selected direction, side lobes in other directions may also be created. Thus, low energy radar 500, when orienting toward selected location (i.e., selected range and selected direction), may receive reflections originating from non-stationary objects (i.e., not clutter) located in at same range, and in directions other than the selected direction. The non-stationary objects located in the same range and in directions other than the selected direction are referred to herein as interfering objects. Accordingly, low energy radar system 500 attempts to determine the effects of each detected object on all the range maps corresponding to locations with the same range, other than the range map corresponding to the detected object, at least according to the locations of the detected object and the selected directions in which system 500 is oriented. To that end, interference nuller 522 determines the effect of the interfering objects on the signals received by each one of receivers $512_1$, $512_2$, ..., $512_N$, and consequently, the effects of the interfering objects on each relevant range map (i.e., the range maps corresponding to locations with the same range as the range at which the interfering object is located) at least according to the locations of the interfering objects and the selected directions in which system 500 is oriented. Interference nuller 522 may further determine the effects of the interfering objects on each range map according to the targets characteristics of the targets these interfering objects are associated with. Furthermore, when orienting in a selected direction, multi-path reflections may create a peak in the range map associated with the selected direction, thereby causing erroneous detection. A 'ghost target' refers herein to a group of previous and current detected ghost objects. Interference nuller 522 alleviates the interference caused by these ghost objects by attempting to determine which targets, if any, exhibiting correlation between the target characteristics thereof (e.g., the velocity of the target, the direction of motion of the target) and determining which targets corresponds to the real detected object (e.g., according to average energy level of the composite signal from detected object associated with the target).

Figure 6:
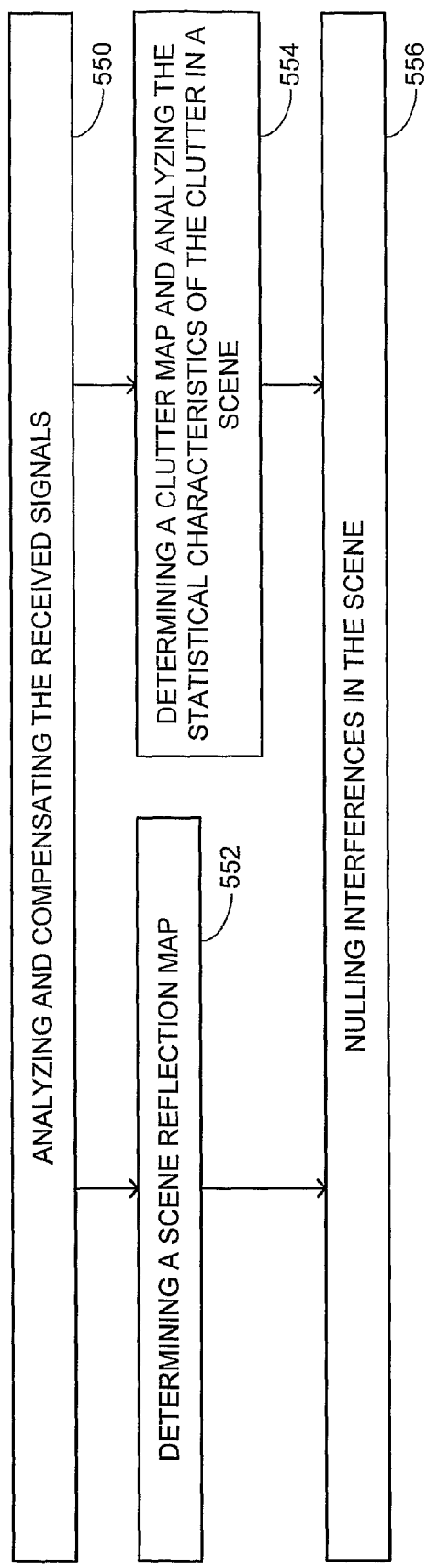
FIG. 6 is a schematic illustration of a method for processing received signals from a scene, in accordance with a further embodiment of the disclosed technique.

Reference is now made to FIG. 6, which is a schematic illustration of a method for processing received signals from a scene, in accordance with another embodiment of the disclosed technique. In procedure 550, the received signals are analyzed and compensated. The received signals are analyzed to overcome deficiencies and changes in the receiving channel such as deficiencies in the receiving array, time dependent changes and environmental changes. When, for example, the transmitted radar signal is a chirped signal, the signal analysis may measure the frequency difference between the signal transmission time and the reception times of the received signals, according to differences between the frequency of the received signals and the frequency of transmitted signal at the time of arrival of the received signals. The difference between the signal transmission time and the reception times of each received signal determines the range from which the reflection was received. Alternatively, when using a transmitted pulse, the difference between the pulse transmission time and the pulse arrival time are determined, and thus the range from which the received signals were reflected. Furthermore, the received signals are compensated for physical phenomenon such as coupling between receiving antennas, cross talk between receivers, coupling between transmitting antenna and receiving antennas and effects of objects (e.g., radar stand) on the receiving antennas. With reference to FIG. 5, signal analyzer and compensator 514 analyzes and compensates the received signal.

In procedure 552, a scene reflection map is determined. As mentioned above, each entry in the scene reflection map is associated with a selected location. Each entry includes a set of values representing the received signal parameters associated with the corresponding location of the entry. The value associated with each entry is determined according to a range map for each selected location. This range map includes the received signals parameters from a plurality of directions at a selected range. Each entry is determined according to the integral of the range map corresponding thereto. With reference to FIG. 5, beam former 520 determines the scene reflections map.

In procedure 554, the clutter map is determined and the statistical characteristics of the clutter in the scene are analyzed. The clutter map includes the values representing the reflection characteristics of substantially stationary objects located at the selected locations in the scene. The clutter map may be a matrix, in which each entry is associated with a corresponding selected location in the scene. Each entry in the matrix includes a set of values representing the clutter reflection characteristics respective of that location. These reflection characteristics include, for example, the average energy level of the composite signal associated with the location and the average composite delay for the location. Each entry in the clutter map may further include statistical characteristics associated with the clutter reflection characteristics (e.g., the variance of the energy levels and the variance of the composite delay). Each entry in the clutter map may further include detection thresholds for each clutter reflection characteristics, as further explained below. A detection probability function, associated with each entry in the clutter map may also be determined according to the clutter reflection characteristics associated with each location. With reference to FIG. 5, clutter characteristics determinator 518 determines the clutter map and the statistical characteristics of the clutter are analyzed.

In procedure 556, the interferences in the scene are nulled. When orienting in a selected direction, reflections originating from moving objects in the scene (i.e., not clutter), located in at same range, and in directions other than the selected direction, may be received and create peaks in the range maps associated with the selected location, thereby causing erroneous detection. Accordingly, the effects of each detected object on all range maps other than the range map corresponding to the detected object are determined. Thus, these effects may be alleviated (e.g., attenuated). Furthermore, multipath reflections may also create peaks in the range maps associated with the selected direction, thereby causing erroneous detection. Consequently, the reflections may be mis-detected as objects at the selected direction. The Interferences caused by these ghost objects are nulled by attempting to determine which targets, if any, exhibits correlation between the target characteristics thereof and determining which targets corresponds to the real detected object. With reference to FIGS. 4D and 4E, example, low energy radar system 402 attempts to determine the effects of car 414 detected at range one and the direction of 45 degrees on the range map corresponding to range one and the direction of zero degrees. Low energy radar system 402 constructs the range map while attenuating the reflections from car 414. With reference to FIG. 5, interference nuller 522 nulls the interferences in the scene.

Figure 7:
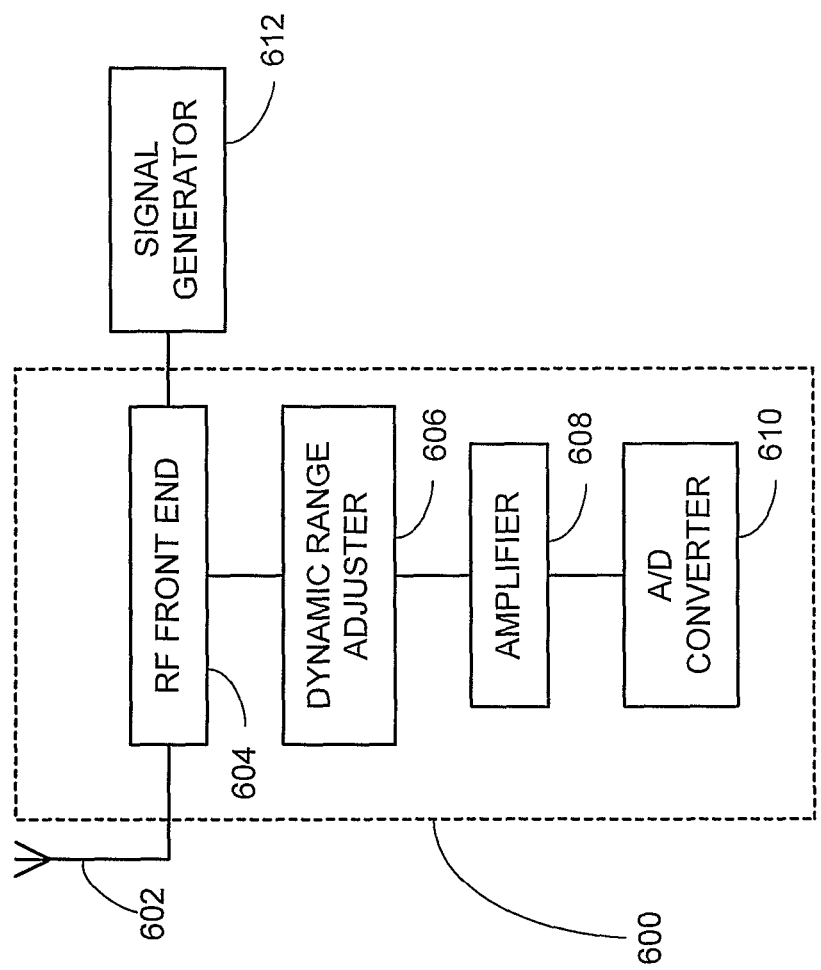
FIG. 7 is a schematic illustration of a receiver constructed and operative in accordance with another embodiment of the disclosed technique.

Reference is now made to FIG. 7, which is a schematic illustration of a receiver, generally referenced 600, constructed and operative in accordance with another embodiment of the disclosed technique. Receiver 600 includes an RF front end 604, a dynamic range adjuster 606, an amplifier 608 and an analog to digital converter 610. Amplifier 608 is coupled with dynamic range adjuster 606 and with analog to digital converter 610. RF front end 604 is coupled with an antenna 602, with a signal generator 612 with dynamic range adjuster 606.

Antenna 602 receives an electromagnetic signal reflected from objects in the scene (both not shown) and produces a signal corresponding to this reflected signal. Antenna 602 provides the signal to RF front end 604. RF front end 604 down converts and filters the signal according to a radar signal form signal generator 612. When the transmitted signal is a chirped signal, RF front end produces a frequency difference signal and provides this frequency difference signal to dynamic range adjuster 606. When the transmitted signal is a pulse RF front end determines the time of arrival of the received pulses. Dynamic range adjuster 606 adjusts the dynamic range of frequency difference signal according a predicted or learned pattern of the frequency behavior of the signal, and provides the adjusted signal to amplifier 608. Amplifier 608 amplifies the signal and provides the amplified signal to analog to digital converter 610, which determines a digital signal representation the amplified signal. Analog to digital converter 610 provides the digital signal to the radar signal processor (not shown).

It will be appreciated by persons skilled in the art that the disclosed technique is not limited to what has been particularly shown and described hereinabove. Rather the scope of the disclosed technique is defined only by the claims, which follow.

The invention claimed is:

1. A low energy mapping radar system comprising:
    a radar signal generator (102) generating a continuous wave frequency modulated radar signal;
    a transmitter (104), coupled with said radar signal generator (102), transmitting said continuous wave frequency modulated radar signal via a transmitting antenna;
    a receiving array (108) including a plurality of receiving antennas ($110_1$ $110_2$, ..., $110_N$) and a plurality of receivers ($112_1$, $112_2$, ..., $112_N$), each antenna being coupled with a corresponding receiver, each of at least selected ones of said receivers ($112_1$, $112_2$, ..., $112_N$) receives a respective signal corresponding to reflections of the transmitted continuous wave frequency modulated radar signal from a scene;
    a processor (113) including:
        a radar signal processor (114), coupled with said receiving array (108), said radar signal processor (114) determines a scene reflections map, said scene reflections map includes entries representing reflection characteristics from each selected location in said scene, said radar signal processor (114) determining each one of said entries according to a respective composite signal associated with said each selected location,
        said radar signal processor (114) determining said respective composite signal according to filtered received signals corresponding to the range associated with the respective selected location, said filtered received signals being determined according to received signals received by said selected ones of said receivers ($112_1$, $112_2$, ..., $112_N$), by filtering in each received signal, the same frequency band corresponding to the range associated with said respective selected location,
        said radar signal processor (114) further determining said respective composite signal according to adjusted phases of said filtered received signals, said adjusted phases corresponding to the direction associated with said respective selected location;
    a detector (116), coupled with said radar signal processor (114), detecting objects in the scene and the corresponding locations thereof according to said scene reflection map and a clutter map, said clutter map includes entries representing clutter reflection characteristics from each selected location in said scene; and
    a power controller (117), coupled with said radar signal generator (102), with said transmitter (104), with said receiving array (108) and with said processor (113), after said transmitter (106) transmitted said radar signal and said receiving array (108) received said signal corresponding to reflections of said transmitted continuous wave frequency modulated radar signal, said power controller (117) shuts down at least one of said radar signal generator (102), said transmitter (104) and said receiving array (108).

2. The system according to claim 1, wherein said power controller further shuts down said processor after said radar signal processor processed the received signals and said detector detected said objects in the scene.

3. The system according to claim 1, wherein said radar signal processor is further coupled with said radar signal generator, and
    wherein said radar signal processor further includes a frequency analyzer, said frequency analyzer at least analyzes the frequencies of the received signal and at least equalizing the received frequencies to correct the different attenuations of the received signal at different frequencies.

4. The system according to claim 1, wherein said radar signal processor includes a beam former, said beam former determines said scene reflections map.

5. The system according to claim 4, wherein each entry in said scene reflection map is associated with a selected location in said scene, each said entry includes a set of values representing reflection characteristics associated with the location corresponding to said entry.

6. The system according to claim 5, wherein said beam former determines reflection characteristics corresponding to each entry by determining a range map for each selected location, said range map includes the reflection characteristics of a plurality of directions at the selected range corresponding to the entry when said system is oriented in the direction corresponding to the entry.

7. The system according to claim 4, wherein said radar signal processor includes a clutter characteristics determinator, said clutter characteristics determinator determines said clutter map.

8. The system according to claim 7, in which each entry in said clutter map is associated with a corresponding selected location in said scene, each entry includes a set of values representing the clutter reflection characteristics respective of that location.

9. The system according to claim 8, wherein said reflection characteristics and said clutter reflection characteristics are selected from the group consisting of:
    received energy levels;
    the phase of the received signal;
    the statistical characteristics of said received energy levels; and the statistical characteristics of said phase of the received signal.

10. The system according to claim 8, wherein said clutter characteristics determinator determines, for each entry in the clutter map, a detection threshold respective of at least a selected portion of said clutter reflection characteristics.

11. The system according to claim 10, wherein said detector detects an object in the scene when said reflection characteristics exceed said respective detection threshold associated with the respective entry in said clutter map.

12. The system according to claim 8, wherein said detector determines the probability that an object exists in a selected direction according to a detection probability function.

13. The system according to claim 12, wherein said probability function is predetermined.

14. The system according to claim 12, wherein said clutter characteristics determinator determines said detection probability function for each location in said scene, at least according to the clutter reflection characteristics associated with each location.

15. The system according to claim 7, wherein said clutter characteristics determinator further updates said clutter map according to said scene reflection map.

16. The system according to claim 15, wherein said clutter map is determined according to a long term weighted average of scene reflections maps.

17. The system according to claim 1, wherein said processor further includes an interference nuller, coupled with said beam former and with said detector, said interference nuller determines the effect of an interfering object on the signals received by each one of said receivers, and alleviating the effects of the interfering objects on said scene reflection map, said interfering objects are defined as non-stationary objects located in the selected range and in directions other than the selected direction, said selected range and said selected direction corresponding to said selected location.

18. The system according to claim 17, wherein said Interference nuller determines the effects of the interfering object on each range map, and
wherein said beam former constructs said range maps while attenuating the reflections from the interfering object.

19. The system according to claim 1, wherein said radar signal processor further includes a compensator, coupled between said frequency analyzer and with said beam former, said compensator corrects the effects of physical phenomenon, and
wherein said physical phenomenon is selected from the group consisting of:
coupling between receiving antennas;
cross talk between receivers;
coupling between transmitting antennas and receiving antennas; and
effects of objects on the receiving antennas.

20. The system according to claim 19, wherein said physical phenomenon includes the effects of one antenna on the other antennas.

21. The system according to claim 20, wherein said physical phenomenon further includes effects of metallic objects in the vicinity of said on said receiving antennas and said transmitting antenna.

22. The system according to claim 20, wherein said physical phenomenon further includes effects of changes in temperature on said system.

23. The system according to claim 1, further comprising a tracker, coupled with said detector, said tracker determining the object characteristics of the detected objects and determines object corresponding to targets from said detected objects according to said object characteristics.

24. The system according to claim 23, wherein said tracker further classifies said targets and determines targets of interests accordingly.

25. The system according to claim 24, wherein said power controller shuts down said tracker after said tracker determines object corresponding to targets and targets of interest.

26. The system according to claim 23, further comprising a communications transmitter coupled with a control station, with said detector with said tracker and with said power controller, said communications transmitters transmits information relating to said detected objects to said control station.

27. The system according to claim 26, wherein said communication transmitter is further coupled with said tracker, said communication transmitters further transmits information relating to said targets to said control station.

28. The system according to claim 27, wherein said power controller shuts down said communications transmitter after said communications transmitter transmitted said information.

29. A low energy radar system comprising:
a radar signal generator (202) generating a radar signal;
a transmitting array (204) including a plurality of transmitting antennas ($220_1, 220_2, \ldots, 220_N$) and a plurality of transmitters ($222_1, 222_2, \ldots, 222_N$), each antenna being coupled with a corresponding transmitter, each transmitter being coupled with said radar signal generator (202), for each direction associated with a selected location in said scene, selected ones of said transmitters ($222_1, 222_2, \ldots, 222_N$) simultaneously transmitting respective continuous wave frequency modulated radar signals each with a respective adjusted phase between said selected ones of said transmitters corresponding to said direction associated with said selected location;
a receiver (206), coupled with said radar signal generator (202), receiving reflected signals from said selected direction in said scene;
a processor (209) including:
a radar signal processor (210), coupled with said receiver (206), said radar signal processor (210) determines a scene reflections map, said scene reflections map includes entries representing reflection characteristics from each selected location in said scene, said radar signal processor (210) determining each one of said entries according to a respective composite signal associated with said each selected location,
said radar signal processor (210) determining said respective composite signal according to filtered received signal corresponding to the range associated with the respective selected location, said filtered received signal being determined according to received signal received by said receiver (206), by filtering in each received signal, the same frequency band corresponding to the range associated with said respective selected location,
said radar signal processor (210) further determining the adjusted phases of each said continuous wave frequency modulated radar signals;
a detector (212), coupled with said radar signal processor (210), detecting objects and targets in the scene and the corresponding location thereof according to said scene reflection map and a clutter map, said clutter map includes values representing clutter reflection characteristics from each selected location in said scene; and a power controller (215), coupled with said radar signal generator (202), with said transmitters (222₁, 222₂, . . . , 222_N)544 1 with said receiver (206) and with said processor (209), after said transmitters (222₁ 222₂, . . . , 222_N)transmitted said continuous wave frequency modulated radar signal and said receiver (206) received said signal corresponding to reflections of said transmitted continuous wave frequency modulated radar signal, said power controller (215) shuts down at least one of said radar signal generator (202), said transmitters (222₁ 222₂, . . . , 222_N)and said receiver (206).

30. Low energy mapping radar method comprising the procedures of:
- determining a clutter map of a scene;
- transmitting by a transmitter a continuous wave frequency modulated radar signal toward said scene, said continuous wave frequency modulated radar signal being generated by a radar signal generator;
- receiving by each of at least selected ones of antennas in a receiving array a respective signal corresponding to reflections of the transmitted signal from said scene;
- processing by a processor the received signals to determine a scene reflection map, said scene reflections map includes entries representing reflection characteristics from each selected location in said scene, each one of said entries being determined according to a respective composite signal associated with said each selected location,
- said respective composite signal being determined according to filtered received signals corresponding to the range associated with the respective selected location, said filtered received signals being determined according to received signals, by filtering in each received signal, the same frequency band corresponding to the range associated with said respective selected location, said composite signal being further determined according to adjusted phases of said filtered received signals, said adjusted phases corresponding to the direction associated with said respective selected location;
- detecting objects in the scene and the locations thereof, at least according to the scene reflection map and the clutter map; and
- shutting down at least one of said radar signal generator, said transmitter and said receiving array, after said procedure of receiving.

31. The method according to claim 30, further comprising the procedure of tracking the detected objects in the scene.

32. The method according to claim 31, further comprising the procedure of classifying said detected objects.

33. The method according to claim 30, wherein said procedure of processing said received signals includes the sub-procedures of:
- analyzing and compensating the received signals;
- analyzing statistical characteristics of the clutter in said scene; and
- nulling the interferences in the scene,
- each entry in said scene reflection map includes values corresponding to parameters corresponding to said received signals, each value being determined from a range maps corresponding to said entry, each range map includes the received signals parameters from a plurality of directions at the range associated with said entry.

34. The method according to claim 33, wherein said procedure of nulling includes determining the effect of an interfering object on the signals received by each one of said receivers, and determining the effects of the interfering object on each range map,
- wherein said each said range maps is re-constructed for each selected location while nulling the reflections of the interfering object.

* * * * *